United States Patent
Yeo et al.

(10) Patent No.: US 11,296,850 B2
(45) Date of Patent: Apr. 5, 2022

(54) METHOD AND APPARATUS FOR TRANSMISSION AND RECEPTION OF SIDELINK FEEDBACK IN WIRELESS COMMUNICATION SYSTEM

(71) Applicant: Samsung Electronics Co., Ltd., Gyeonggi-do (KR)

(72) Inventors: Jeongho Yeo, Gyeonggi-do (KR); Hyunseok Ryu, Gyeonggi-do (KR); Cheolkyu Shin, Gyeonggi-do (KR); Sungjin Park, Gyeonggi-do (KR); Jinyoung Oh, Gyeonggi-do (KR); Jonghyun Bang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 130 days.

(21) Appl. No.: 16/861,683

(22) Filed: Apr. 29, 2020

(65) Prior Publication Data

US 2020/0351057 A1 Nov. 5, 2020

(30) Foreign Application Priority Data

May 2, 2019 (KR) .................. 10-2019-0051796
May 17, 2019 (KR) .................. 10-2019-0058405

(51) Int. Cl.
*H04L 5/00* (2006.01)
*H04W 72/04* (2009.01)
(Continued)

(52) U.S. Cl.
CPC ........... *H04L 5/0055* (2013.01); *H04W 72/02* (2013.01); *H04W 72/0406* (2013.01);
(Continued)

(58) Field of Classification Search
CPC ..... H04L 1/1854; H04L 1/1861; H04L 5/001; H04L 5/0023; H04L 5/0025;
(Continued)

(56) References Cited

U.S. PATENT DOCUMENTS 8,270,923 B2 * 9/2012 Li ................. H04B 7/086
455/276.1
2017/0325277 A1 * 11/2017 Fujishiro ............. H04W 4/06
(Continued)

FOREIGN PATENT DOCUMENTS

CN 112311504 A * 2/2021 ............ H04L 1/18
KR 20210040065 A * 4/2021 .......... H04B 7/0645
(Continued)

OTHER PUBLICATIONS

Intel Corporation, "Design of Physical Layer Procedures for NR V2X Sidelink", R1-1904299, 3GPP TSG RAN WG1 RAN1#96bis, Apr. 8-12, 2019, 11 pages.
(Continued)

*Primary Examiner* — Thomas R Cairns
(74) *Attorney, Agent, or Firm* — The Farrell Law Firm, P.C.

(57) ABSTRACT

The present disclosure relates to a communication method and system for converging a 5th-Generation (5G) communication system with a technology for Internet of Things (IoT). Methods and apparatuses are provided in which first sidelink data and second sidelink data are received from one or more terminals. It is determined whether a first resource for transmitting first feedback information for the first sidelink data and a second resource for transmitting second feedback information for the second sidelink data overlap each other. When the first resource and the second resource overlap each other, feedback information corresponding to one of the first feedback information and the second feedback information having a higher priority, is transmitted to the one or more terminals. A priority of each of the first feedback information and the second feedback information is based on sidelink control information scheduling each of the first sidelink data and the second sidelink data.

12 Claims, 32 Drawing Sheets

(51) Int. Cl.
*H04W 72/02* (2009.01)
*H04W 72/12* (2009.01)
*H04W 76/14* (2018.01)
*H04W 92/18* (2009.01)

(52) U.S. Cl.
CPC ... *H04W 72/0446* (2013.01); *H04W 72/1242* (2013.01); *H04W 76/14* (2018.02); *H04W 92/18* (2013.01)

(58) Field of Classification Search
CPC ... H04L 5/0035; H04L 5/0055; H04L 5/0064; H04L 5/0087; H04L 5/0089; H04L 5/0091–0098; H04L 27/2602–26136; H04L 27/2646; H04L 2001/0092–0097; H04W 8/20; H04W 36/0072; H04W 52/367; H04W 52/383; H04W 56/0005; H04W 56/0045; H04W 72/02; H04W 72/0406; H04W 72/0413–0433; H04W 72/0466; H04W 72/1242; H04W 76/14; H04W 84/042; H04W 84/045–047; H04W 84/18; H04W 92/18
See application file for complete search history.

(56) References Cited

U.S. PATENT DOCUMENTS

| | | | |
|---|---|---|---|
| 2018/0279275 A1 | 9/2018 | Chen et al. | |
| 2019/0132104 A1* | 5/2019 | Lee | H04L 1/1607 |
| 2020/0106566 A1* | 4/2020 | Yeo | H04W 28/04 |
| 2020/0229210 A1* | 7/2020 | Bharadwaj | H04L 5/0055 |
| 2020/0305176 A1* | 9/2020 | Hu | H04L 1/1819 |
| 2021/0050950 A1* | 2/2021 | Zhou | H04L 1/1861 |
| 2021/0050958 A1* | 2/2021 | Sarkis | H04L 1/1854 |
| 2021/0058877 A1* | 2/2021 | Wu | H04L 5/0048 |
| 2021/0127402 A1* | 4/2021 | Lee | H04W 76/27 |

FOREIGN PATENT DOCUMENTS

| | | | | |
|---|---|---|---|---|
| WO | WO-2016136492 A1 * | 9/2016 | | H04W 92/18 |
| WO | WO-2020146629 A1 * | 7/2020 | | H04W 28/26 |
| WO | WO-2021013180 A1 * | 1/2021 | | H04L 5/0094 |
| WO | WO-2021030323 A1 * | 2/2021 | | H04L 1/1887 |
| WO | WO-2020164531 A9 * | 4/2021 | | H04L 1/18 |
| WO | WO-2021159464 A1 * | 8/2021 | | H04W 72/02 |

OTHER PUBLICATIONS

MediaTek Inc., "On Sidelink Resource Allocation Mechanism", R1-1904494, 3GPP TSG RAN WG1 Meeting #96bis, Apr. 8-12, 2019, 9 pages.

LG Electronics, "Discussion on Physical Layer Procedures for NR Sidelink", R1-1905443, 3GPP TSG RAN WG1 Meeting #96bis, Apr. 8-12, 2019, 12 pages.

ITL, "Physical Layer Procedure for NR V2X", R1-1905101, 3GPP TSG RAN WG1 #96bis, Apr. 8-12, 2019, 4 pages.

International Search Report dated Aug. 6, 2020 issued in counterpart application No. PCT/KR2020/005787, 7 pages.

* cited by examiner

FIG. 19

| logical slot index in resource pool | 1 | 2 | 3 | 4 | 5 | 6 | | 7 | | | 8 | 9 | 10 | 11 | 12 | 13 |
|---|---|---|---|---|---|---|---|---|---|---|---|---|---|---|---|---|
| Slot | n-2 | n-1 | n | n+1 | n+2 | n+3 | n+4 | n+5 | n+6 | n+7 | n+8 | n+9 | n+10 | n+11 | n+12 | n+13 | n+14 | n+15 | n+16 |
| Whether to correspond to resource pool | 0 | 0 | 0 | X | 0 | 0 | 0 | X | X | X | 0 | X | X | 0 | 0 | 0 | 0 |
| Whether PSFCH can be transmitted | 0 | X | 0 | X | X | 0 | X | X | X | X | 0 | X | X | 0 | 0 | X | 0 |
| Slot in which PSSCH corresponding to HARQ-ACK feedback to be included in PSFCH has been transmitted | n-2 | | n-1 | | | n | | | | | n+3 | | | n+8 | | | n+14 |
| | | | | | n+2 | | | | | | n+4 | | | n+11 | | | n+15 |
| | | | | | | | | | | | | | | | | | n+12 |
| | | | | | | | | | | | | | | | | | n+13 |

FIG. 20

| Slot index | | | | | n-Δ-N+1-Δ | ... | n-Δ-N-1 | n-Δ-N | n-Δ-N+1 | ... | n-Δ-2 | n-Δ-1 | n-Δ | ... | n-2 | n-1 | n |
|---|---|---|---|---|---|---|---|---|---|---|---|---|---|---|---|---|---|
| Whether to correspond to resource pool | X | X | O | O | O | O | O | O | O | O | O | O | O | X | X | X | O |
| Whether PSFCH can be transmitted | | | | | | | | | O | | | | | | | | O |

FIG. 21

| logical slot index in resource pool | 1 | 2 | 3 | | 4 | 5 | 6 | | | 7 | | | | 8 | 9 | 10 | 11 | 12 | 13 |
|---|---|---|---|---|---|---|---|---|---|---|---|---|---|---|---|---|---|---|---|
| Slot | n-2 | n-1 | n | n+1 | n+2 | n+3 | n+4 | n+5 | n+6 | n+7 | n+8 | n+9 | n+10 | n+11 | n+12 | n+13 | n+14 | n+15 | n+16 |
| Whether to correspond to resource pool | O | O | O | X | O | O | O | X | X | X | O | X | X | O | O | O | O | O | O |
| Whether PSFCH can be transmitted | O | X | O | X | X | O | X | X | X | X | O | X | X | O | O | O | O | X | O |

Slot in which PSSCH corresponding to HARQ-ACK feedback to be included in PSFCH has been transmitted n-2 n-1
n n+2
n+3
n+4 n+8 n+11
n+12 n+13
n+14

FIG. 22

| logical slot index in resource pool | 1 | 2 | | 3 | 4 | 5 | 6 | | | | 7 | 8 | 9 | 10 | 11 | 12 | 13 |
|---|---|---|---|---|---|---|---|---|---|---|---|---|---|---|---|---|---|
| Slot | n-2 | n-1 | n | n+1 | n+2 | n+3 | n+4 | n+5 | n+6 | n+7 | n+8 | n+9 | n+10 | n+11 | n+12 | n+13 | n+14 | n+15 | n+16 |
| Whether to correspond to resource pool | O | O | X | O | O | O | O | O | X | X | O | X | X | O | O | O | O |
| Whether PSFCH can be transmitted | X | O | X | X | O | X | O | X | X | X | O | X | X | O | O | O | X | O |

Slot in which PSSCH corresponding to HARQ-ACK feedback to be included in PSFCH has been transmitted n-2
n-1 n+1 n+2
n+3
n+4
n+5 n+8 n+11 n+12
n+13

FIG. 23

| logical slot index in resource pool | 1 | 2 | 3 | 4 | 5 | 6 | 7 | 8 | 9 | 10 | 11 | 12 | 13 |
|---|---|---|---|---|---|---|---|---|---|---|---|---|---|
| Slot | n-2 | n-1 | n | n+1 | n+2 | n+3 | n+4 | n+5 | n+6 | n+7 | n+8 | n+9 | n+10 | n+11 | n+12 | n+13 | n+14 | n+15 | n+16 |
| Whether to correspond to resource pool | O | O | X | O | O | O | O | O | O | X | X | X | X | O | O | O | O |
| Whether PSFCH can be transmitted | O | X | X | X | X | O | X | X | X | X | X | X | X | O | X | X | O |

Slot in which PSSCH corresponding to HARQ-ACK feedback to be included in PSFCH has been transmitted n-2
n-1
n
n+1
n+2
n+3
n+4
n+5
n+6 n+12
n+13

FIG. 24

| logical slot index in resource pool | 1 | 2 | | 3 | 4 | 5 | 6 | | | | 7 | 8 | 9 | 10 | 11 | 12 | 13 |
|---|---|---|---|---|---|---|---|---|---|---|---|---|---|---|---|---|---|
| Slot | n-2 | n-1 | n | n+1 | n+2 | n+3 | n+4 | n+5 | n+6 | n+7 | n+8 | n+9 | n+10 | n+11 | n+12 | n+13 | n+14 | n+15 | n+16 |
| Whether to correspond to resource pool | O | O | X | O | O | O | O | O | X | X | X | X | O | O | O | O | O |
| Whether PSFCH can be transmitted | X | O | X | X | O | O | X | X | X | X | X | X | O | O | O | X | O |

Slot in which PSSCH corresponding to HARQ-ACK feedback to be included in PSFCH has been transmitted n-2   n+1   n+2   n+10   n+12
n-1         n+3   n+11   n+13
            n+4
            n+5

METHOD AND APPARATUS FOR TRANSMISSION AND RECEPTION OF SIDELINK FEEDBACK IN WIRELESS COMMUNICATION SYSTEM

CROSS-REFERENCE TO RELATED APPLICATIONS

This application is based on and claims priority under 35 U.S.C. § 119(a) to Korean Patent Application Nos. 10-2019-0051796 and 10-2019-0058405 filed on May 2, 2019 and May 17, 2019, respectively, in the Korean Intellectual Property Office, the disclosures of which are incorporated herein by reference in their entireties.

BACKGROUND

1. Field

The disclosure relates generally to a method and an apparatus for transmitting feedback on a data transmission in a sidelink, and more particularly, to a method for configuring a hybrid automatic repeat request-acknowledgment (HARQ-ACK) codebook and a method for determining a timing of transmitting a feedback when data is transmitted to a sidelink and HARQ-ACK information about the corresponding data is transmitted from a receiving terminal to a terminal having transmitted the data.

2. Description of Related Art

To meet the demand for wireless data traffic having increased since deployment of 4G communication systems, efforts have been made to develop an improved 5G or pre-5G communication system. The 5G or pre-5G communication system is also referred to as a 'Beyond 4G Network' or a 'Post LTE System'. The 5G communication system is implemented in higher frequency (mmWave) bands (e.g., 60 GHz bands), so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) have been developed as an advanced coding modulation (ACM), and filter bank multi carrier (FBMC), non-orthogonal multiple access (NOMA), and sparse code multiple access (SCMA) have been developed as an advanced access technology.

The Internet is now evolving to the Internet of things (IoT) where distributed entities exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In a wireless communication system, and particularly, in a New Radio (NR) system, as data is transmitted from a transmitting end to a receiving end, the receiving end transmits HARQ-ACK feedback information of the corresponding data to the transmitting end after receiving the data. For example, in transmitting downlink data, a terminal transmits, to a base station, HARQ-ACK feedback information of the data transmitted from the base station on a configured resource. Also, in transmitting sidelink data, a receiving terminal may transmit an HARQ-ACK feedback to a transmitting terminal. Such HARQ-ACK feedback may be used as information for the transmitting terminal to determine retransmission or the like. A physical sidelink feedback channel (PSFCH) may be used as a physical channel on which the receiving terminal transmits the HARQ-ACK feedback.

Because all slots of the sidelink may not have resources on which the PSFCH can be transmitted, it may be necessary for the receiving terminal to transmit a plurality of pieces of HARQ-ACK feedback information on a plurality of pieces of data on one PSFCH.

SUMMARY

According to an embodiment, a method is provided that performed by a terminal in a communication system. First sidelink data and second sidelink data are received from one or more terminals. It is determined whether a first resource for transmitting first feedback information for the first sidelink data and a second resource for transmitting second feedback information for the second sidelink data overlap each other. When the first resource and the second resource overlap each other, feedback information corresponding to one of the first feedback information and the second feedback information having a higher priority, is transmitted to the one or more terminals. A priority of each of the first feedback information and the second feedback information is based on sidelink control information scheduling each of the first sidelink data and the second sidelink data.

According to an embodiment, a terminal in a communication system is provided. The terminal includes a transceiver and a controller. The controller is configured to receive, from one or more terminals via the transceiver, first sidelink data and second sidelink data. The controller is also configured to determine whether a first resource for transmitting first feedback information for the first sidelink data and a second resource for transmitting second feedback information for the second sidelink data overlap each other.

When the first resource and the second resource overlap each other, the controller is further configured to transmit, to the one or more terminals via the transceiver, feedback information corresponding to one of the first feedback information and the second feedback information having a higher priority. A priority of each of the first feedback information and the second feedback information is based on sidelink control information scheduling each of the first sidelink data and the second sidelink data.

BRIEF DESCRIPTION OF THE DRAWINGS

The above and other aspects, features, and advantages of the disclosure will be more apparent from the following detailed description, when taken in conjunction with the accompanying drawings, in which:

FIG. 19 is a diagram illustrating a terminal determining a slot for transmitting an HARQ-ACK feedback, according to an embodiment;

FIG. 20 is a diagram illustrating the maximum number of HARQ-ACK feedback bits that a terminal should transmit on one PSFCH, according to an embodiment;

FIG. 21 is a diagram illustrating a terminal determining a slot for transmitting an HARQ-ACK feedback, according to another embodiment;

FIG. 22 is a diagram illustrating a terminal determining a slot for transmitting an HARQ-ACK feedback, according to another embodiment;

FIG. 23 is a diagram illustrating a terminal determining a slot for transmitting an HARQ-ACK feedback, according to another embodiment;

FIG. 24 is a diagram illustrating a terminal determining a slot for transmitting an HARQ-ACK feedback, according to another embodiment;

DETAILED DESCRIPTION

Figure 1:
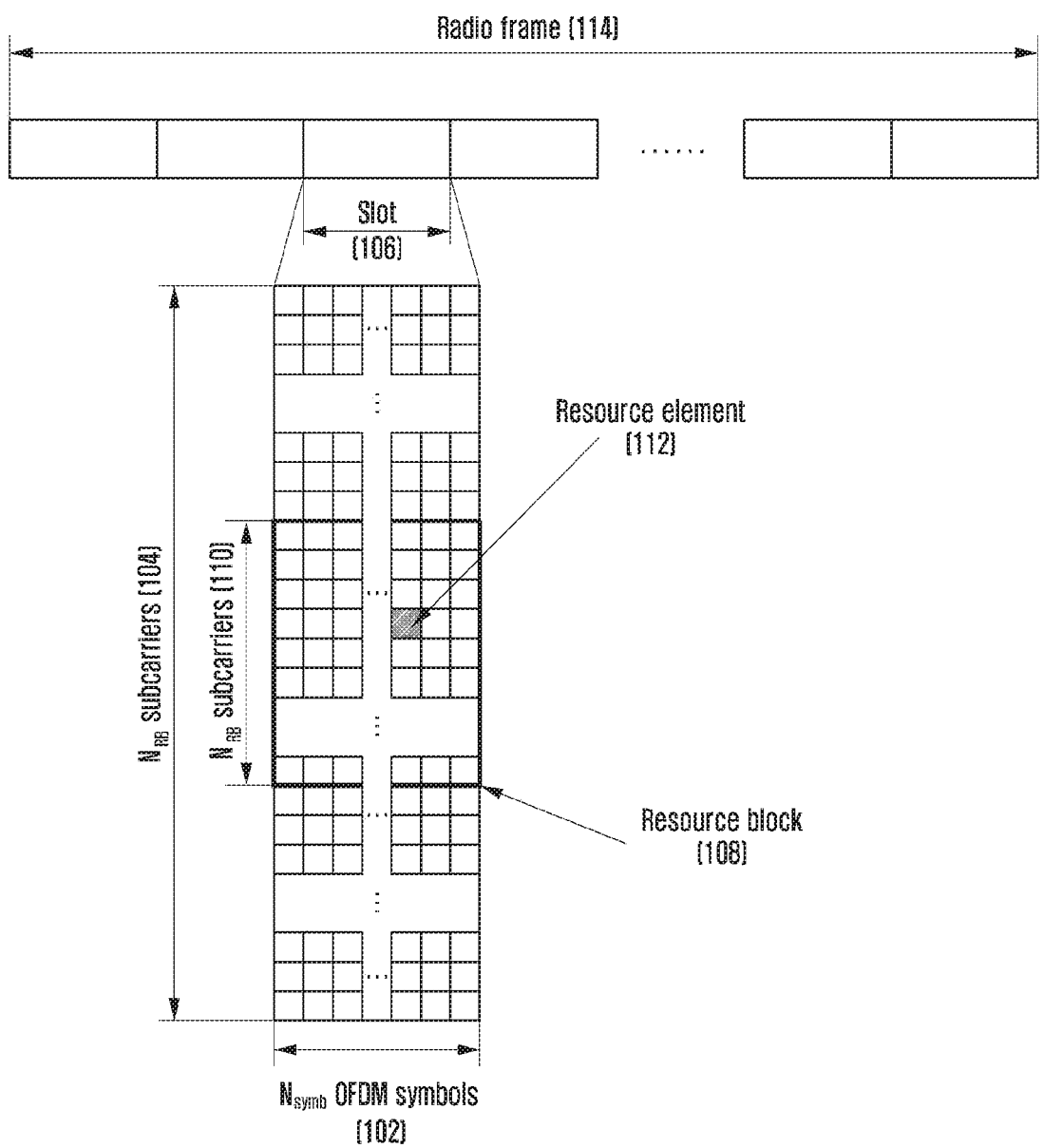
FIG. 1 is a diagram illustrating the basic structure of a time-frequency domain that is a radio resource region in which data or a control channel is transmitted on a downlink or an uplink in an NR system.

In an NR access technology, various services have been designed so that they can be freely multiplexed on time and frequency resources. Accordingly, waveform/numerology and reference signals can be dynamically or freely allocated as needed for the corresponding services. In order to provide optimum services to a terminal in wireless communications, it is important to optimize the data transmission through measurement of the channel quality and the interference amount. Thus, it is essential to measure an accurate channel state. However, in case of the 5G channel, in contrast with the 4G communication in which the channel and interference characteristics are not greatly changed depending on the frequency resources, the channel and interference characteristics are greatly changed depending on the services. Thus, it is necessary to support a subset of frequency resource group (FRG) dimensions that make it possible to dividedly measure the channel and interference characteristics. In the NR system, supported services may be divided into categories of an enhanced mobile broadband (eMBB), massive machine type communications (mMTC), and ultra-reliable and low-latency communications (URLLC). The eMBB may be a service aimed at high-speed transmission of high-capacity data, the mMTC may be a service aimed at minimization of a terminal power and accesses of a plurality of terminals, and the URLLC may be a service aimed at high reliability and low latency. Different requirements may be applied in accordance with the kinds of services applied to the terminal.

Hereinafter, embodiments of the disclosure will be described in detail with reference to the accompanying drawings.

In describing the embodiments, explanation of technical contents that are well known in the art to which the disclosure pertains and are not directly related to the disclosure will be omitted. This is to describe the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "unit", as used herein, means, but is not limited to, a software or hardware component, such as field programmable gate array (FPGA) or application specific integrated circuit (ASIC), which performs certain tasks. However, the term "unit" is not meant to be limited to software or hardware. The term "unit" may advantageously be configured to reside on the addressable storage medium and configured to execute on one or more processors. Thus, the term "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. Further, the components and units may be implemented to operate one or more CPUs in a device or a security multimedia card. Further, in an embodiment, a unit may include one or more processors.

A wireless communication system was initially developed for the purpose of providing a voice-oriented service, but it has been expanded to, for example, a broadband wireless communication system that provides a high-speed and high-quality packet data service together with the communication standards, such as 3GPP high speed packet access (HSPA), long term evolution (LTE) or evolved universal terrestrial radio access (E-UTRA), LTE-Advanced (LTE-A), 3GPP2 high rate packet data (HRPD), ultra-mobile broadband (UMB), and IEEE 802.16e. Also, for the 5th generation wireless communication system, 5G or NR communication standards have been developed.

In the NR system, which is a representative example of broadband wireless communication systems, the downlink (DL) and uplink (UL) adopt orthogonal frequency division multiplexing (OFDM) schemes. More specifically, the DL adopts a cyclic-prefix OFDM (CP-OFDM) scheme, and the UL adopts a discrete Fourier transform spreading OFDM (DFT-S-OFDM) scheme in addition to the CP-OFDM. The UL means a radio link in which a terminal (or user equipment (UE) or mobile station (MS)) transmits data or a control signal to a base station (or gNodeB or base station (BS)), and the DL means a radio link in which the base station transmits data or a control signal to the terminal. Such a multi-access scheme may discriminate data or control information of respective users from each other by allocating and operating time-frequency resources on which the data or control information of the respective users is to be carried so that the time-frequency resources do not overlap each other, that is, so as to establish orthogonality.

The NR system adopts a hybrid automatic repeat request (HARQ) scheme in which a physical layer retransmits the corresponding data if decoding failure occurs during an initial transmission. According to the HARQ scheme, a receiver may transmit information (negative acknowledgement (NACK)) for notifying a transmitter of the decoding failure if the receiver has not accurately decoded the data, and the transmitter may make a physical layer retransmit the corresponding data. The receiver may combine the data that is retransmitted by the transmitter with the previous data of which the decoding has failed to heighten the data reception performance. Further, if the receiver has accurately decoded the data, the HARQ scheme may transmit information (acknowledgement (ACK)) for notifying of a decoding success to the transmitter, so that the transmitter can transmit new data.

FIG. 1 is a diagram illustrating the basic structure of a time-frequency domain that is a radio resource region in which data or a control channel is transmitted on a downlink or an uplink in an NR system.

With reference to FIG. 1, a horizontal axis represents a time domain, and a vertical axis represents a frequency domain. In the time domain, the minimum transmission unit is an OFDM symbol, and $N_{symb}$ OFDM symbols 102 constitute one slot 106. The length of the subframe is defined as 1.0 ms, and a radio frame is defined as 10 ms. In the frequency domain, the minimum transmission unit is a subcarrier, and the transmission bandwidth of the whole system is composed of $N_{BW}$ subcarriers 104 in total.

In the time-frequency domain, the basic unit of resources is a resource element (RE) 112, which may be expressed by an OFDM symbol index and a subcarrier index. A resource block (RB) 108 or a physical resource block (PRB) is defined by $N_{RB}$ contiguous subcarriers 110 in the frequency domain. In general, the minimum transmission unit of data is the RB as described above. In the NR system, $N_{symb}$=14 and $N_{RB}$=12, and $N_{BW}$ is in proportion to the bandwidth of the system transmission band. The data rate may be increased in proportion to the number of RBs that are scheduled to the terminal.

For an FDD system that operates to discriminate a DL and an UL by means of frequencies in the NR system, the DL transmission bandwidth and the UL transmission bandwidth may differ from each other. A channel bandwidth indicates an RF bandwidth corresponding to the system transmission bandwidth. Tables 1 and 2 present a part of the corresponding relationship among the system transmission bandwidth that is defined by the NR system in a frequency band that is lower than 6 GHz and in a frequency band that is higher than 6 GHz, subcarrier spacing, and channel bandwidth. For example, the NR system having 100 MHz channel bandwidth with 30 kHz subcarrier spacing has the transmission bandwidth that is composed of 273 RBs. Hereinafter, N/A may be a bandwidth-subcarrier combination that is not supported by the NR system.

TABLE 1

| Channel bandwidth $BW_{Channel}$ [MHz] | Subcarrier Spacing | 5 MHz | 10 MHz | 20 MHz | 50 MHz | 80 MHz | 100 MHz |
|---|---|---|---|---|---|---|---|
| Transmission bandwidth configuration $N_{RB}$ | 15 kHz | 25 | 52 | 106 | 270 | N/A | N/A |
| | 30 kHz | 11 | 24 | 51 | 133 | 217 | 213 |
| | 60 kHz | N/A | 11 | 24 | 65 | 107 | 135 |

TABLE 2

| Channel bandwidth $BW_{channel}$ [MHz] | Subcarrier Spacing | 50 MHz | 100 MHz | 200 MHz | 400 MHz |
|---|---|---|---|---|---|
| Transmission bandwidth configuration $N_{RB}$ | 60 kHz | 66 | 132 | 264 | N/A |
| | 120 kHz | 32 | 66 | 132 | 264 |

In the NR system, the frequency range may be dividedly defined by FR1 and FR2 as shown in Table 3 below.

TABLE 3

| Frequency range designation | Corresponding frequency range |
|---|---|
| FR1 | 450 MHz-7125 MHz |
| FR2 | 24250 MHz-52600 MHz |

As described above, it may be possible that the range of the FR1 and FR2 may be differently applied. For example, the frequency range of FR1 may be changed and applied from 450 MHz to 6000 MHz.

In the NR system, scheduling information on DL data or UL data is transferred from the base station to the terminal through downlink control information (DCI). The DCI may be defined in accordance with various formats, and it may corresponds to whether the DCI is scheduling information on UL data (UL grant) or scheduling information on DL data (DL grant) according to each format, whether the DCI is compact DCI having a small size of control information, whether spatial multiplexing using multiple antennas is applied, and whether the DCI is DCI for power control. For example, DCI format 1-1 that is the scheduling control information on the DL data (DL grant) may include at least one piece of the following control information.

Carrier indicator: indicating on which frequency carrier the corresponding DCI is transmitted.

DCI format indicator: an indicator discriminating whether the corresponding DCI is for a downlink or an uplink.

Bandwidth part (BWP) indicator: indicating from which BWP the corresponding DCI is transmitted.

Frequency domain resource assignment: indicating the RB of the frequency domain allocated to the data transmission. An expressed resource is determined in accordance with the system bandwidth and resource allocation scheme.

Time domain resource assignment: indicating from what OFDM symbol of what slot a data related channel is to be transmitted.

VRB-to-PRB mapping: indicating in which scheme a virtual RB (VRB) index and a physical RB (PRB) index are mapped onto each other.

Modulation and coding scheme (MCS): indicating a modulation scheme and the size of a transport block that is data intended to be transmitted.

HARQ process number: indicating a process number of HARQ.

New data indicator: indicating whether HARQ is initially transmitted or retransmitted.

Redundancy version: indicating a redundancy version of HARQ.

Transmit power control (TCP) command for a physical uplink control channel (PUCCH): indicating a transmission power control command for PUCCH that is an uplink control channel.

For data transmission through a physical uplink shared channel (PUSCH), as described above, the time domain resource assignment may be transferred by information on a slot on which the PUSCH is transmitted, a start OFDM symbol location S on the corresponding slot, and the number L of symbols onto which the PUSCH is mapped. As described above, the location S may be a relative location from the start of the slot, L may be the number of contiguous symbols, and S and L may be determined by a start and length indicator value (SLIV) defined as follows.

$$\text{if } (L - 1) \le 7 \text{ then } (L - 1) \le 7$$
$$SLIV = 14 \cdot (L - 1) + S$$
$$\text{else}$$
$$SLIV = 14 \cdot (14 - L + 1) + (14 - 1 - S)$$
$$\text{where } 0 < L \le 14 - S$$

In the NR system, the terminal can be configured with information on the SLIV value, the PUSCH mapping type, and the PUSCH transmission slot in one row through radio resource control (RRC) configuration (e.g., the above-described information may be configured in the form of a table). Thereafter, in the time domain resource assignment of the DCI, the base station can transfer the information on the SLIV value, the PUSCH mapping type, and the PUSCH transmission slot to the terminal by indicating index values in the configured table.

In the NR system, type A and type B have been defined as the PUSCH mapping type. According to the PUSCH mapping type A, the first symbol of DMRS symbols is located on the second or third OFDM symbol of the slot. According to the PUSCH mapping type B, the first symbol of the DMRS symbols is located on the first OFDM symbol in the time domain resource allocated through the PUSCH transmission.

The PUSCH resource mapping method, as described above, may also be applied to the downlink data transmission through the physical downlink shared channel (PDSCH) in a similar manner. In the NR system, the PDSCH mapping type may be defined as type A and type B, and particularly in the mapping type B, the first symbol of the DMRS symbols may be located on the first symbol of the PDSCH.

The DCI may pass through a channel coding and modulation process, and may be transmitted on a PUCCH that is a downlink physical control channel. Herein, the control information being transmitted on the PDCCH or PUCCH may be expressed as a case in which the PDCCH or PUCCH is transmitted. In the same manner, the data being transmitted on the PUSCH or PDSCH may be expressed as a case in which the PUSCH or PDSCH is transmitted.

In general, the DCI is scrambled with a specific radio network temporary identifier (RNTI) (or terminal identifier) independently of respective terminals to be added with a CRC, is channel-coded, and then is configured as independent PDCCHs to be transmitted. The PDCCH is mapped onto a control resource set (CORESET) configured to the terminal to be transmitted.

The downlink data may be transmitted on a PDSCH that is a physical channel for downlink data transmission. The PDSCH may be transmitted after a control channel transmission interval, and scheduling information, such as a detailed mapping location in the frequency domain and a modulation scheme, is determined based on the DCI being transmitted on the PDCCH.

Through the MCS among the control information constituting the DCI, the base station notifies the terminal of a modulation scheme applied to the PDSCH intended to be transmitted to the terminal and the size of data (transport block size (TBS)) intended to be transmitted. The MCS may be composed of 5 bits or more or less. The TBS corresponds to the size of the data (transport block (TB)) that the base station intends to transmit before the channel coding for error correction is applied thereto.

Herein, the TB may include a medium access control (MAC) header, a MAC control element (CE), one or more MAC service data units (SDUs), and padding bits. Further, the TB may indicate a data unit being delivered from the MAC layer to the physical layer or a MAC protocol data unit (PDU).

The modulation scheme that is supported in the NR system may be quadrature phase shift keying (QPSK), 16 quadrature amplitude modulation (16 QAM), 64 QAM, and 256 QAM, and respective modulation orders Qm correspond to 2, 4, 6, and 8. That is, for the QPSK modulation, 2 bits per symbol may be transmitted, and for the 16 QAM, 4 bits per symbol may be transmitted. Further, for the 64 QAM, 6 bits per symbol may be transmitted, and for the 256 QAM, 8 bits per symbol may be transmitted.

Figure 2:
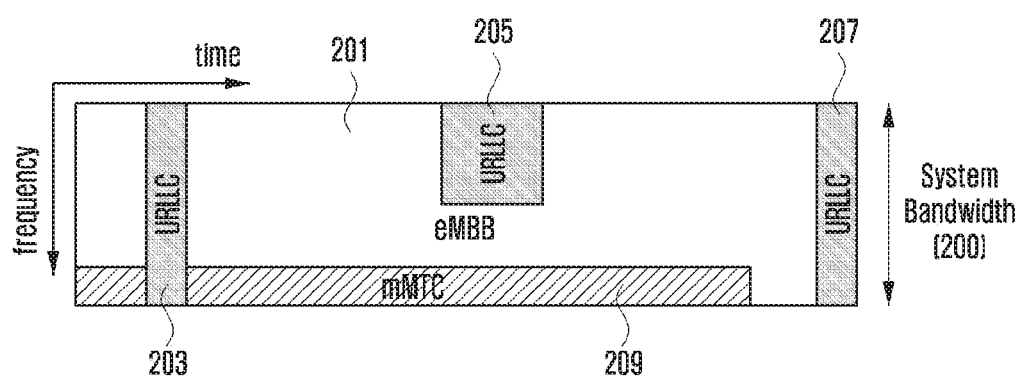
FIG. 2 is a diagram illustrating frequency and time resources allocated for information transmission in an NR system, according to an embodiment.
Figure 3:
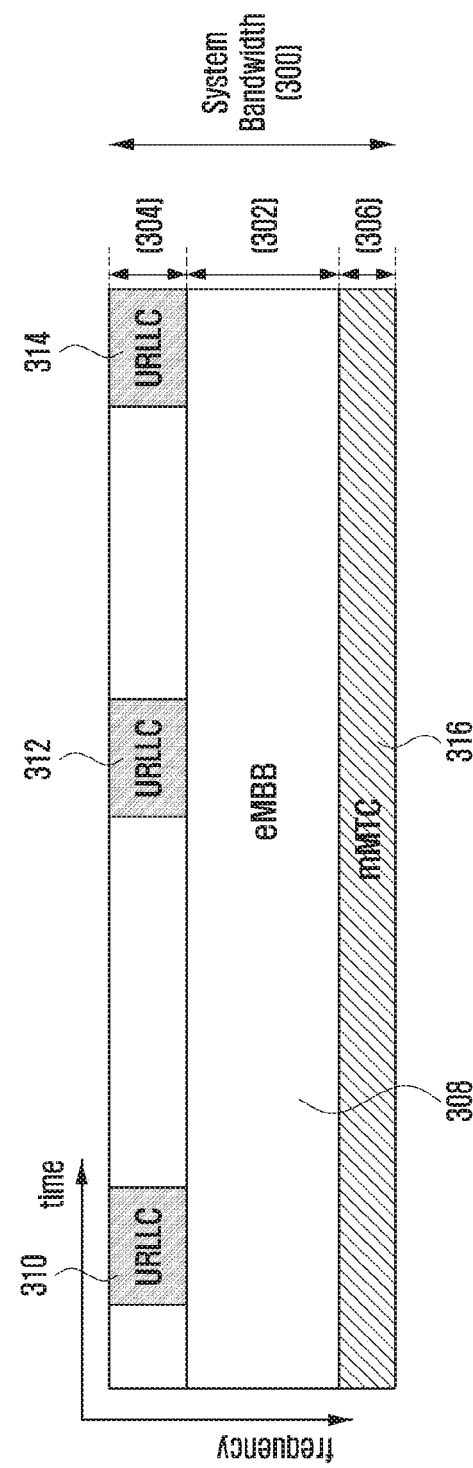
FIG. 3 is a diagram illustrating frequency and time resources allocated for information transmission in an NR system, according to another embodiment.

FIGS. 2 and 3 are diagrams illustrating a state where data for eMBB, URLLC, and mMTC, which are services being considered in a 5G or NR system, are allocated with frequency-time resources.

With reference to FIGS. 2 and 3, it can be identified that frequency and time resources are allocated for information transmission in the respective systems. FIG. 2 is a diagram illustrating frequency and time resources allocated for information transmission in the NR system, according to an embodiment.

FIG. 2 illustrates that data for eMBB, URLLC, and mMTC are allocated in a whole system frequency band 200. If URLLC data 203, 205, and 207 is generated while eMBB 201 and mMTC 209 are allocated and transmitted in a specific frequency band, and transmission of the generated URLLC data is necessary, the URLLC data 203, 205, and 207 may be transmitted without emptying or transmitting a portion in which the eMBB 201 and the mMTC 209 have already been allocated. Because it is necessary to reduce a latency of the URLLC among the above-described services, the URLLC data 203, 205, and 207 is allocated to a portion of the resource 201 allocated to the eMBB to be transmitted. Of course, if the URLLC is additionally allocated and transmitted on the eMBB-allocated resource, the eMBB data may not be transmitted on the redundant frequency-time resources, and thus, the transmission performance of the eMBB data may be lowered. An eMBB data transmission failure due to the URLLC allocation may occur.

FIG. 3 is a diagram illustrating frequency and time resources allocated for information transmission in the NR system, according to another embodiment.

In FIG. 3, respective subbands 302, 304, and 306 that are obtained through division of a whole system frequency band 300 may be used for the purpose of transmitting services and data. Information related to subband configuration may be predetermined, and this information may be transmitted from a base station to a terminal through higher signaling. Further, information related to the subbands may be optionally divided by the base station or a network node, and services may be provided to the terminal without transmission of separate subband configuration information to the terminal. FIG. 3 illustrates a state where the subband 302 is used to transmit eMBB data, the subband 304 is used to transmit URLLC data, and the subband 306 is used to transmit mMTC data.

The length of a transmission time interval (TTI) that is used for URLLC transmission may be shorter than the length of the TTI that is used to transmit the eMBB or mMTC. Further, a response to the information related to the URLLC may be transmitted earlier than that of the eMBB or mMTC, and thus, the information can be transmitted and received with a low latency. Physical layer channels used for respective types to transmit the three kinds of services or data as described above may have different structures. For example, at least one of the TTI length, frequency resource allocation unit, control channel structure, and data mapping method may differ Although three kinds of services and three kinds of data have been described, more than three kinds of services and corresponding data may exist, and even in such a case, the contents of the disclosure will be able to be applied.

In order to explain a method and an apparatus of the embodiments herein, the terms "physical channel" and "signal" in an NR system may be used. However, the contents of the disclosure may also be applied to a wireless communication system that is not the NR system.

A sidelink (SL) is also referred to as a signal transmission/reception path between terminals, and may be interchangeably used with a PC5 interface. Hereinafter, the base station is the subject that performs resource allocation to the terminal, and may be a base station supporting both vehicle-to-everything (V2X) communication and general cellular communication or a base station supporting only V2X communication. That is, the base station may mean an NR base station (gNB), LTE base station (eNB), or road site unit (RSU) (or fixed station). The terminal may include user equipment, mobile station, vehicle supporting vehicular-to-vehicular communication (V2V), vehicle supporting vehicular-to-pedestrian (V2P), pedestrian's handset (e.g., smart phone), vehicle supporting vehicular-to-network communication (V2N), vehicle supporting vehicular-to-infrastructure communication (V2I), RSU mounted with a terminal function, RSU mounted with a base station function, or RSU mounted with a part of a base station function and a part of a terminal function. In the disclosure, a DL is a radio transmission path of a signal that is transmitted from the base station to the terminal, and an UL means a radio transmission path of a signal that is transmitted from the terminal to the base station. Hereinafter, although the NR system is exemplified in embodiments of the disclosure, the embodiments of the disclosure can be applied to even other various communication systems having similar technical backgrounds or channel types. Further, the embodiments of the disclosure may also be applied to other communication systems through partial modifications thereof in a range that does not greatly deviate from the scope of the disclosure by the judgment of those skilled in the art.

In the disclosure, the terms "physical channel" and "signal" in the related art may be interchangeably used with data or a control signal. For example, although the PDSCH is a physical channel on which data is transmitted, it may be called data in the disclosure.

Hereinafter, in the disclosure, higher signaling is a signal transfer method in which the base station transfers a signal to the terminal using a downlink data channel of a physical layer, or the terminal transfers a signal to the base station using an uplink data channel of the physical layer, and it may also be mentioned as RRC signaling or MAC CE.

In the following embodiments, a method and an apparatus for performing data transmission/reception between the base station and the terminal or between the terminals are provided. Data may be transmitted from one terminal to a plurality of terminals, or data may be transmitted from one terminal to one terminal. Further, data may be transmitted from a base station to a plurality of terminals. However, the data transfer is not limited thereto, but the disclosure will be able to be applied to various cases.

Figure 4:
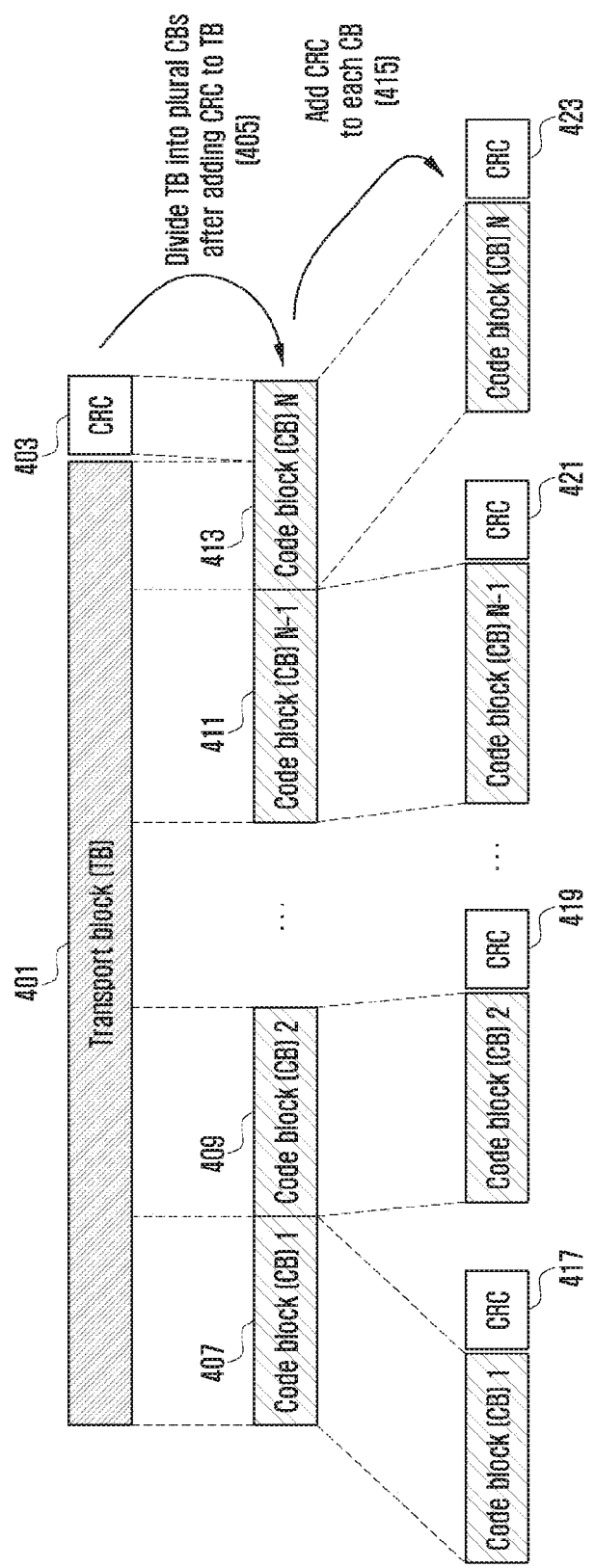
FIG. 4 is a diagram illustrating a process in which one transport block is divided into several code blocks and cyclic redundancy check (CRC) is added to each of the code blocks, according to an embodiment.

FIG. 4 is a diagram illustrating a process in which one transport block is divided into several code blocks and CRCs are added thereto, according to an embodiment.

With reference to FIG. 4, a CRC 403 is added to the last or head portion of one TB 401 intended to be transmitted on an uplink or a downlink. The CRC 403 may be composed of 16 bits, 24 bits, or a prefixed bit number, or may be composed of a variable bit number in accordance with channel situations. The CRC 403 may be used to determine whether channel coding has succeeded. A block including the TB 401 and the CRC 403 added thereto is divided into several code blocks (CBs) 407, 409, 411, and 413, in operation 405. The divided code blocks may have predetermined maximum sizes, and the last code block 413 may have a size that is smaller than the size of other code blocks 407, 409, and 411. However, this is merely exemplary, and according to another example, the last code block 413 may be set to have the same length as the length of other code blocks 407, 409, and 411 through insertion of 0, a random value, or 1 into the last code block 413. CRCs 417, 419, 421, and 423 are respectively added to the code blocks 407, 409, 411, and 413, at operation 415. The CRC may be composed of 16 bits, 24 bits, or a prefixed bit number, and may be used to determine whether channel coding has succeeded.

In order to create the CRC 403, the TB 401 and a cyclic generator polynomial may be used, and the cyclic generator polynomial may be defined in various methods. For example, if it is assumed that a cyclic generator polynomial for the CRC of 24 bits is $gCRC24A(D)=D^{24}+D^{23}+D^{18}+D^{17}+D^{14}+D^{11}+D^{10}+D^7+D^6+D^5+D^4+D^3+D+1$, and L is L=24, with respect to TB data $a_0, a_1, a_2, a_3, \ldots, a_{A-1}$, CRC $p_0, p_1, p_2, p_3, \ldots, p_{L-1}$ may be determined as a value obtained by dividing $a_0D^{A+23}+a_1D^{A+22}+\ldots+a_{A-1}D^{24}+p_0+D^{23}+p_1D^{22}+\ldots+p_{22}D^1+p_{23}$ by $gCRC24A(D)$ with a remainder of 0. In the above-described example, although it is assumed that the CRC length L is 24, the CRC length L may be determined to include various lengths, such as 12, 16, 24, 32, 40, 48, 64, and the like.

After the CRC is added to the TB in the process as described above, the TB is divided into N CBs 407, 409, 411, and 413. CRCs 417, 419, 421, and 423 are added to the divided CBs 407, 409, 411, and 413, respectively, at operation 415. The CRC added to the CB may have a length that is different from the length of the CRC added to the TB, or another cyclic generator polynomial may be used. However, the CRC 403 added to the TB and the CRCs 417, 419, 421, and 423 added to the code blocks may be omitted depending on the kind of channel code that is to be applied to the code blocks. For example, if an LDPC code, rather than a turbo code, is to be applied to the code blocks, the CRCs 417, 419, 421, and 423 to be inserted into the respective code blocks may be omitted.

However, even when the LDPC is applied, the CRCs 417, 419, 421, and 423 may be added to the code blocks as they are. Further, even when a polar code is used, the CRCs may be added or omitted.

As described above with reference to FIG. 4, in the TB intended to be transmitted, the maximum length of one code block may be determined in accordance with the kind of the applied channel coding, and in accordance with the maximum length of the code blocks, division of the TB and the CRC added to the TB into the code blocks may be performed.

In an LTE system, a CRC for a CB is added to a divided CB, and data bits of the CB and the CRC are encoded with a channel code to determine coded bits, and as pre-engaged with respect to the respective coded bits, the number of the rate-matched bits may be determined.

In an NR system, the size of the TB may be calculated through the following steps.

Step 1: In one PRB within an allocated resource, $N_{RE}'$ that is the number of REs allocated to PDSCH mapping is calculated.

Here, $N_{RB}'$ may be calculated by $N_{sc}^{RB} \cdot N_{symb}^{sh} - N_{DMRS}^{PRB} - N_{oh}^{PRB}$. Here, $N_{sc}^{RB}$ is 12, and $N_{symb}^{sh}$ may indicate the number of OFDM symbols allocated to the PDSCH. $N_{DMRS}^{PRB}$ is the number of REs in one PRB occupied by a DMRS of a CDM group. $N_{oh}^{PRB}$ is the number of REs occupied by an overhead in one PRB configured through higher signaling, and may be configured to one of 0, 6, 12, and 18. Thereafter, the total number $N_{RE}$ of REs allocated to the PDSCH may be calculated. Here, $N_{RE}$ is calculated as $\min(156, N_{RR}') \cdot n_{PRB}$, and $n_{PRB}$ indicates the number of PRBs allocated to the terminal.

Step 2: The number $N_{info}$ of temporary information bits may be calculated as $N_{RE} \ast R \ast Q_m \ast v$. Here, R is a code rate, $Q_m$ is a modulation order, and information of these values may be transferred using a table pre-engaged with an MCS bit field in control information. Further, v is the number of allocated layers. If $N_{info} \leq 3824$ a TBS may be calculated through step 3 below. Otherwise, the TBS may be calculated through step 4.

Step 3: $N_{info}'$ may be calculated through formulas of $$N_{info}' = \max\left(24, 2^n \ast \left\lfloor \frac{N_{info}}{2^n} \right\rfloor\right)$$

and $n = \max(3, \lfloor \log_2(N_{info}) \rfloor - 6)$. The TBS may be determined as a value that is closest to $N_{info}'$ among values that are not smaller than $N_{info}'$ in Table 4 below.

TABLE 4

| Index | TBS |
|---|---|
| 1 | 24 |
| 2 | 32 |
| 3 | 40 |
| 4 | 48 |

TABLE 4-continued

| Index | TBS |
|---|---|
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 99 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1268 |
| 62 | 1326 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 3038 |
| 75 | 2152 |
| 76 | 2216 |
| 77 | 2280 |
| 78 | 3408 |
| 79 | 9479 |
| 80 | 2536 |
| 81 | 2600 |
| 82 | 2664 |

TABLE 4-continued

| Index | TBS |
|---|---|
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Step 4: $N_{info}'$ may be calculated through formulas of $$N'_{info} = \max\left(3840, 2^n \times \text{round}\left(\frac{N_{info} - 24}{2^n}\right)\right)$$

and $n = \lfloor \log_2(N_{info}-24) \rfloor - 5$. The TBS may be determined through $N_{info}'$ value and [pseudo-code 1] below.

Pseudo-code 1
 if R ≤ 1/4

$$TBS = 8*C*\left\lceil\frac{N'_{inf\,o}+24}{8*C}\right\rceil - 24, \text{ where } C = \left\lceil\frac{N'_{inf\,o}+24}{3816}\right\rceil$$

else
  if $N_{inf\,o}' > 8424$ $$TBS = 8*C*\left\lceil\frac{N'_{inf\,o}+24}{8*C}\right\rceil - 24, \text{ where } C = \left\lceil\frac{N'_{inf\,o}+24}{8424}\right\rceil$$

else $$TBS = 8*\left\lceil\frac{N'_{inf\,o}+24}{8}\right\rceil - 24$$

end if
 end if

If one CB is inputted to an LDPC encoder in an NR system, parity bits may be added to the CB to be outputted. The quantity of parity bits may differ in accordance with an LDCP base graph. A method for sending all parity bits created by LDPC coding with respect to a specific input may be called full buffer rate matching (FBRM). A method for limiting the number of transmittable parity bits may be called a limited buffer rate matching (LBRM). If resources are allocated for data transmission, an LDPC encoder output is made as a circular buffer, and bits of the made buffer are repeatedly transmitted to the extent of the allocated resources. The length of the circular buffer may be $N_{cb}$. If the number of all parity bits being created by the LDPC coding is N, the length of the circular buffer becomes $N_{cb} = N$ in the FBRM method.

In the LBRM method, $N_{cb}$ becomes $\min(N, N_{ref})$, $N_{ref}$ is given as $$\left\lfloor\frac{TBS_{LBRM}}{C \cdot R_{LBRM}}\right\rfloor,$$

and $R_{LBRM}$ may be determined as ⅔. In order to obtain $TBS_{LBRM}$, the above-described method for obtaining the TBS, and the maximum number of layers supported by the terminal in the corresponding cell and the maximum modulation order configured to the terminal in the corresponding cell may be assumed, and 64 QAM may be assumed in case that the maximum modulation order is not configured. Further, it may be assumed that the code rate is 948/1024 that is the maximum code rate, $N_{RE}$ is $156 \cdot n_{PRB}$, and $n_{PRB}$ is $n_{PRB,LBRM}$. Here, $n_{PRB,LBRM}$ may be given as in Table 5 below.

TABLE 5

| Maximum number of PRBs across all configured BWPs of a carrier | $n_{PRB,LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In the NR system, the maximum data rate supported by the terminal may be determined through mathematical Equation (1) below.

$$\text{data rate (in } Mbps\text{)} = 10^{-6} \cdot \sum_{j=1}^{J}\left(v_{Layers}^{(j)} \cdot Q_m^{(j)} \cdot f^{(j)} \cdot R_{max} \cdot \frac{N_{PRB}^{BW(j)\mu} \cdot 12}{T_s^\mu} \cdot (1 - OH^{(j)})\right) \quad (1)$$

In Equation (1), J is the number of carriers tied through carrier aggregation, $R_{max}=948/1024$, $v_{Layers}^{(j)}$ is the maximum number of layers, $Q_m^{(j)}$ is the maximum modulation order, $f^{(j)}$ is a scaling index, $\mu$ is a subcarrier spacing. Here, $f^{(j)}$ is one value of 1, 0.8, 0.75, and 0.4, which can be reported by the terminal, and $\mu$ may be given as in Table 6 below.

TABLE 6

| $\mu$ | $\Delta f = 2^\mu \cdot$ 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Further, $T_s^\mu$ is an average OFDM symbol length, $T_s^\mu$ may be calculated as $$\frac{10^{-3}}{14 \cdot 2^\mu},$$

and $N_{PRM}^{BW(j),\mu}$ is the maximum number of RBs in BW(j). Further, is an overhead value, which may be given as 0.14 in a downlink of FR1 (not higher than 6 GHz band) and may be given as 0.18 in an uplink, and which may be given as 0.08 in a downlink of FR2 (higher than 6 GHz band) and may be given as 0.10 in an uplink. The maximum data rate in the downlink in the cell having 100 MHz frequency bandwidth in 30 kHz subcarrier spacing through the Equation (1) may be calculated as in Table 7 below.

TABLE 7

| $f^{(i)}$ | $v^{(i)}_{Layers}$ | $Q_m^{(i)}$ | Rmax | $N_{PRB}^{BW(j),\mu}$ | $T_s^\mu$ | $OH^{(j)}$ | data rate |
|---|---|---|---|---|---|---|---|
| 1 | 4 | 8 | 0.92578125 | 273 | 3.57143E-05 | 0.14 | 2337.0 |
| 0.8 | 4 | 8 | 0.92578125 | 273 | 3.57143E-05 | 0.14 | 1869.6 |
| 0.75 | 4 | 8 | 0.92578125 | 273 | 3.57143E-05 | 0.14 | 1752.8 |
| 0.4 | 4 | 8 | 0.92578125 | 273 | 3.57143E-05 | 0.14 | 934.8 |

In contrast, the actual data rate that can be measured by the terminal in the actual data transmission may be a value obtained by dividing the data amount by the data transmission time. This may be TBS in 1 TB transmission, and may be a value obtained by dividing the sum of TBSs by the TTI length in 2 TB transmission. As an example, in the same manner as the assumption to obtain Table 7 above, the maximum actual data rate in the downlink in the cell having the 100 MHz frequency bandwidth in the 30 kHz subcarrier spacing may be determined as in Table 8 below in accordance with the number of allocated PDSCH symbols.

TABLE 8

| $N_{symb}^{sh}$ | $N_{DMRS}^{PRB}$ | $N_{RE}'$ | $N_{RE}$ | $N_{info}$ | n | $N_{info}'$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214230 | 2,409.46 |
| 7 | 8 | 76 | 20748 | 614659.5 | 14 | 622,592 | 74 | 622,760 | 0.250000 | 2,491.04 |
| 8 | 8 | 38 | 24024 | 711711.0 | 14 | 704,512 | 84 | 704,904 | 0.285714 | 2,407.16 |
| 9 | 8 | 100 | 27300 | 808762.5 | 14 | 802,816 | 90 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002805.5 | 14 | 999,424 | 119 | 999,576 | 0.392357 | 2,544.38 |
| 12 | 8 | 136 | 37128 | 1099017.2 | 15 | 1,114,112 | 133 | 1,115,048 | 0.428571 | 2,601.78 |
| 13 | 8 | 148 | 40404 | 1195068.5 | 15 | 1,212,416 | 144 | 1,213,032 | 0.464286 | 2,612.68 |
| 14 | 8 | 100 | 43680 | 1294020.0 | 15 | 1,277,952 | 152 | 1,277,992 | 0.500000 | 2,555.98 |

Through Table 7, it is possible to identify the maximum data rate supported by the terminal, and through Table 8, it is possible to identify the actual data rate following the allocated TBS. The actual data rate may be higher than the maximum data rate in accordance with scheduling information.

In a wireless communication system, and particularly, in an NR system, the data rate that can be supported by the terminal may be pre-engaged between the base station and the terminal. This may be calculated using the maximum frequency band supported by the terminal, the maximum modulation order, and the maximum number of layers. However, the calculated data rate may be different from the value calculated from the TBS being used for the actual data transmission and the length of the TTI.

Accordingly, the terminal may be allocated with a TBS that is larger than the value corresponding to the data rate supported by the terminal itself, and to prevent this, there may be limitations in schedulable TBS in accordance with the data rate supported by the terminal.

Figure 5A:
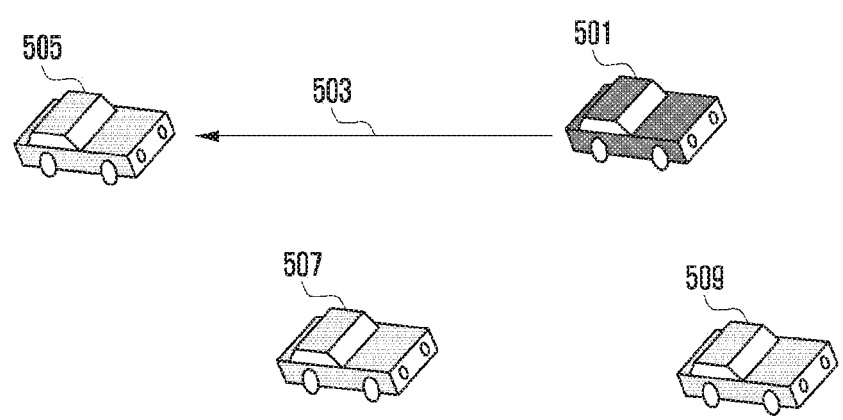
FIG. 5A is a diagram illustrating one-to-one communication, that is, unicast communication, performed between two terminals through a sidelink, according to an embodiment.

FIG. 5A is a diagram illustrating one-to-one communication, that is, unicast communication, performed between two terminals through a sidelink, according to an embodiment.

FIG. 5A illustrates a signal 503 transmitted from a first terminal 501 to a second terminal 505, and the direction of the signal transmission may be opposite to the above-described direction. That is, the signal may be transmitted from the second terminal 505 to the first terminal 501. Other terminals 507 and 509 are unable to receive the signal being exchanged through the unicast communication between the first terminal 501 and the second terminal 505. The signal exchange through the unicast between the first terminal 501 and the second terminal 505 may include processes of mapping resources engaged between the first terminal 501 and the second terminal 505, scrambling using an engaged value, control information mapping, data transmission using a configured value, and identifying inherent ID values. The terminal may be a terminal that moves together with a vehicle. For the unicast, transmission of separate control information, physical control channel, and data may be performed.

Figure 5B:
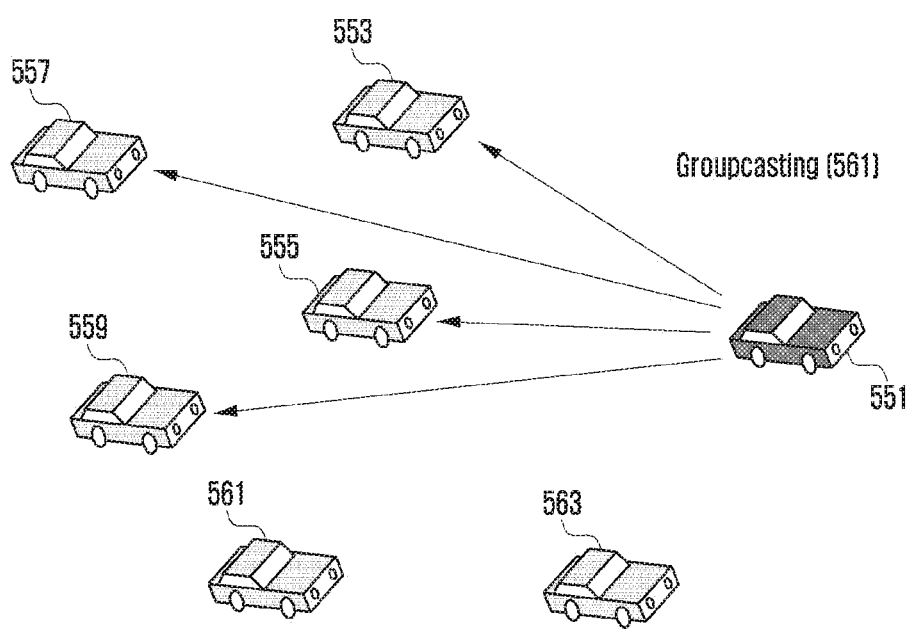
FIG. 5B is a diagram illustrating a groupcast communication in which one terminal transmits common data to a plurality of terminals through a sidelink, according to an embodiment.

FIG. 5B is a diagram illustrating a groupcast communication in which one terminal transmits common data to a plurality of terminals through a sidelink, according to an embodiment.

FIG. 5B illustrates a first terminal 551 transmitting common data to other terminals 553, 555, 557, and 559 in a groupcast 561 through a sidelink, and other terminals 561 and 563 which are not included in the group are unable to receive signals being transmitted for the groupcast 561.

The terminal that transmits the signal for the groupcast may be another terminal in the group, and resource allocation for the signal transmission may be provided by the base station, may be provided by the terminal that serves as a leader in the group, or may be selected by the terminal that transmits the signal. The terminal may be a terminal that moves together with a vehicle. For the groupcasting, transmission of separate control information, physical control channel, and data may be performed.

Figure 6:
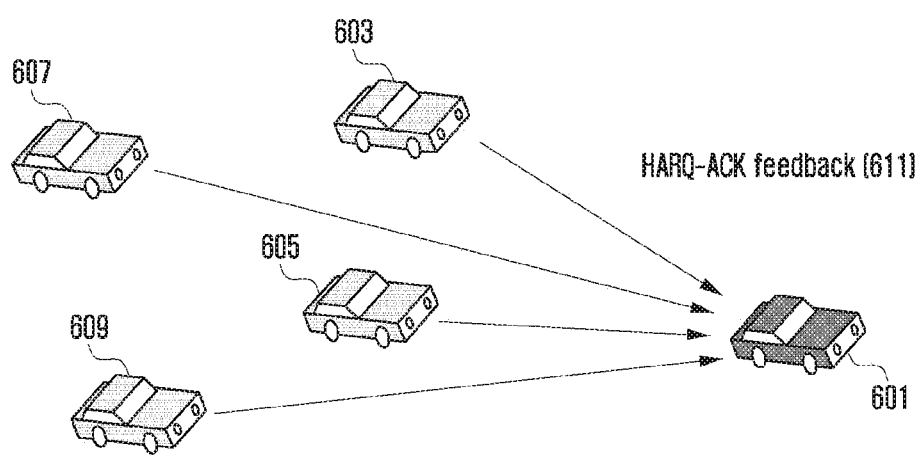
FIG. 6 is a diagram illustrating a process in which terminals having received common data through groupcasting transmit information related to data reception success or failure to a terminal having transmitted the data, according to an embodiment.

FIG. 6 is a diagram illustrating a process in which terminals having received common data through groupcasting transmit information related to data reception success or failure to a terminal having transmitted the data, according to an embodiment. With reference to FIG. 6, terminals 603, 605, 607, and 609, having received the common data through the groupcasting, transmit the information related to the data reception success or failure to a terminal 601 having transmitted the data. The information may be HARQ-ACK feedback 611. Further, the terminals may be terminals having LTE-based sidelink or NR-based sidelink function. The terminal having only the LTE-based sidelink function may be unable to transmit/receive NR-based sidelink signal and a physical channel. The sidelink may be interchangeably used with PC5, V2X, or D2D. In FIGS. 5B and 6, the transmission/reception in accordance with the groupcasting is exemplified, but it may also be applied to unicast signal transmission/reception between the terminals.

Figure 7:
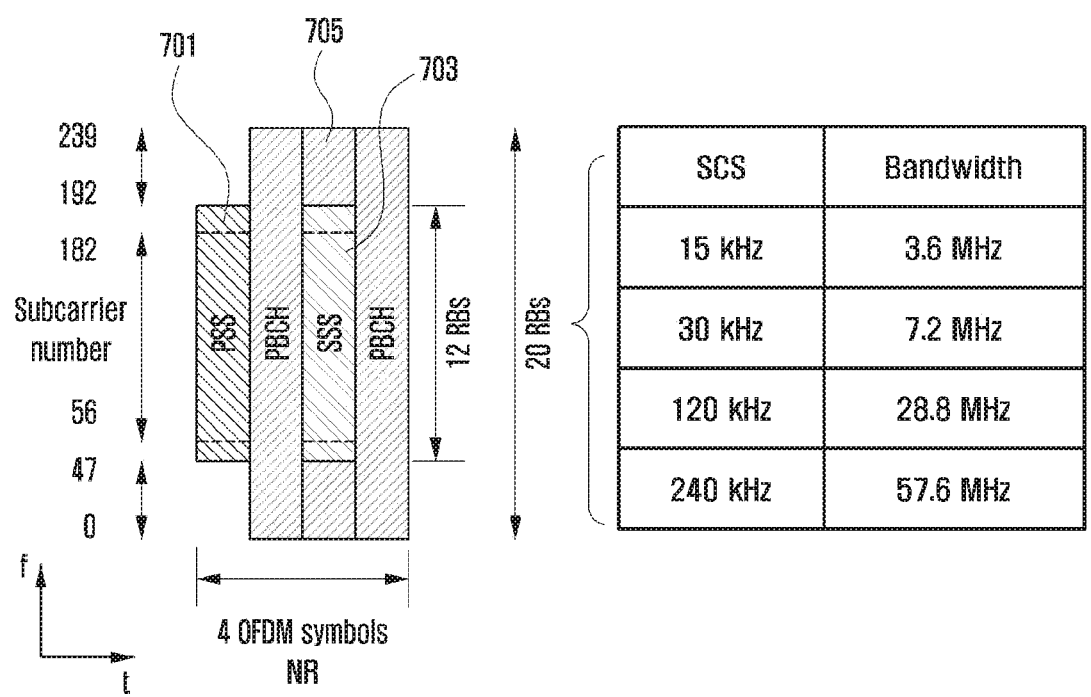
FIG. 7 is a diagram illustrating a state in which a synchronization signal of an NR system and a physical broadcast channel are mapped onto each other in a frequency and time domain, according to an embodiment.

FIG. 7 is a diagram illustrating a state in which a synchronization signal of an NR system and a PBCH are mapped onto each other in the frequency and time domain, according to an embodiment.

A primary synchronization signal (PSS) 701, a secondary synchronization signal (SSS) 703, and a PBCH 705 are mapped onto each other over 4 OFDM symbols. The PSS 701 and the SSS 703 are mapped onto 12 RBs, and the PBCH 705 is mapped onto 20 RBs. It is illustrated in the table of FIG. 7 how the frequency bands of 20 RBs are varied in accordance with a subcarrier spacing (SCS). A resource region on which the PSS 701, SSS 703, and PBCH 705 are transmitted may be referred to as an SS/PBCH block. Further, the SS/PBCH block may be referred to as an SSB block.

Figure 8:
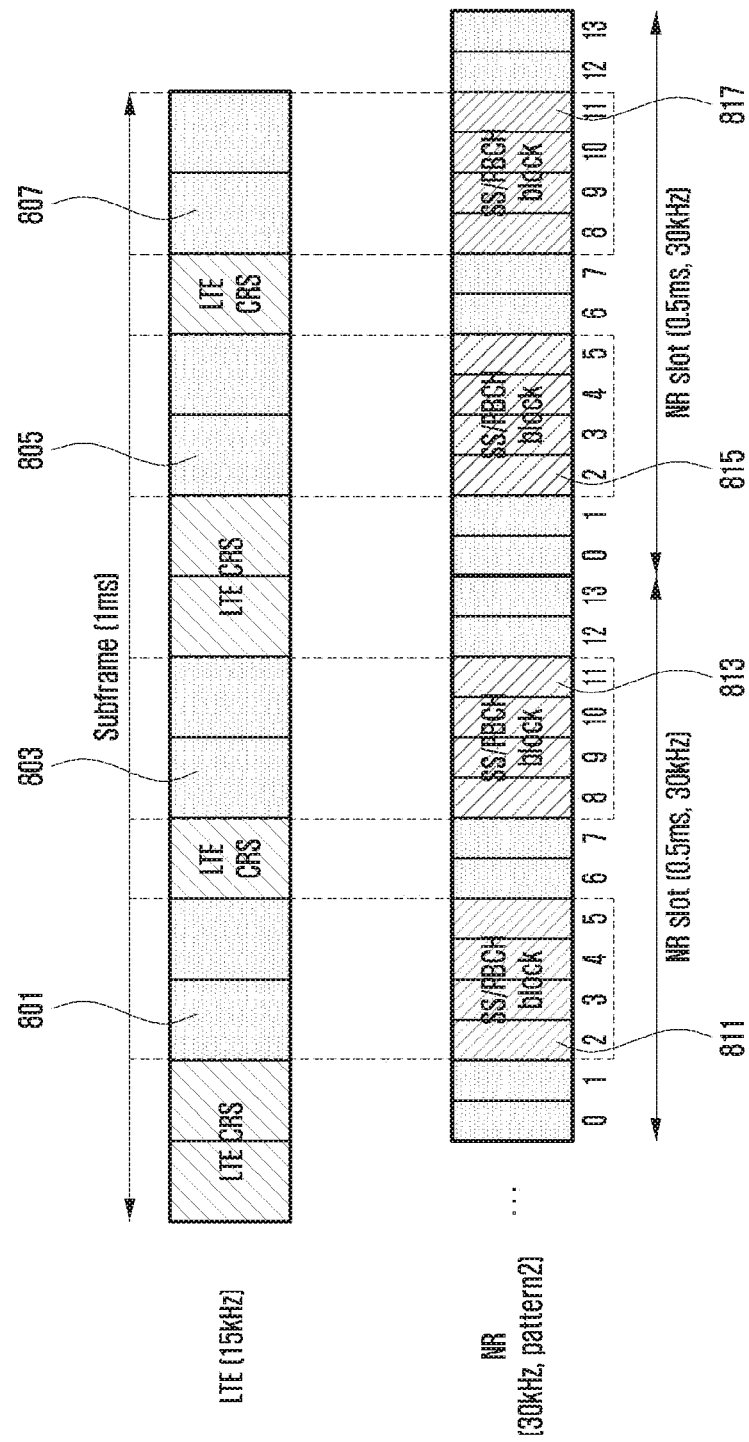
FIG. 8 is a diagram illustrating what symbols one synchronization signal/physical broadcast channel (SS/PBCH) block is mapped onto in a slot, according to an embodiment.

FIG. 8 is a diagram illustrating what symbols one SS/PBCH block is mapped onto in a slot, according to an embodiment.

FIG. 8 illustrates an LTE system using a subcarrier spacing of 15 kHz and an NR system using a subcarrier spacing of 30 kHz. SS/PBCH blocks 811, 813, 815, and 817 of the NR system are transmitted in locations 801, 803, 805, and 807 in which cell-specific reference signals (CRS) being always transmitted in the LTE system can be avoided. This allows the LTE system and the NR system to coexist in one frequency band.

Figure 9:
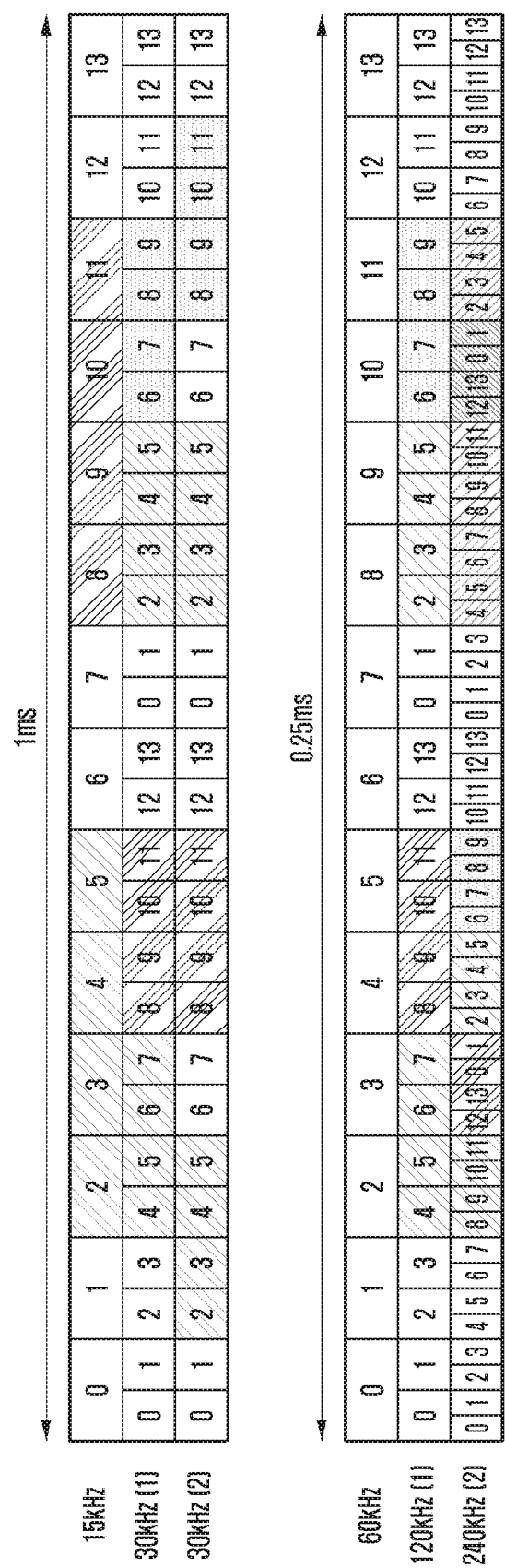
FIG. 9 is a diagram illustrating symbols on which SS/PBCH blocks can be transmitted in accordance with a subcarrier spacing, according to an embodiment.

FIG. 9 is a diagram illustrating symbols on which SS/PBCH blocks can be transmitted in accordance with subcarrier spacing, according to an embodiment.

With reference to FIG. 9, the subcarrier spacing may be configured as 15 kHz, 30 kHz, 120 kHz, and 240 kHz, and in accordance with the subcarrier spacing, the location of a symbol in which an SS/PBCH block (or SSB block) can be located may be determined. FIG. 9 illustrates the symbol location in which the SSB in accordance with the subcarrier spacing can be transmitted on each symbol within 1 ms, and it is not necessary for the SSB to always be transmitted in the region indicated in FIG. 9. Accordingly, the location in which the SSB block is transmitted may be configured in the terminal through system information or dedicated signaling.

Figure 10:
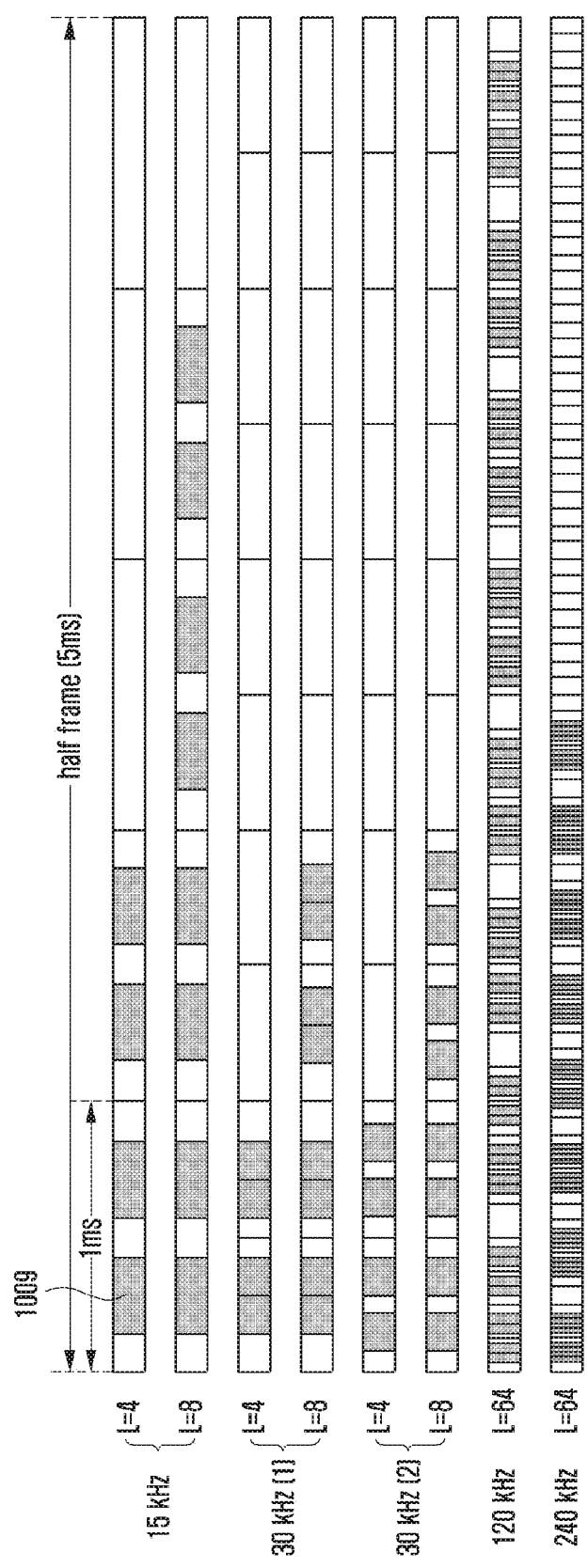
FIG. 10 is another diagram illustrating symbols on which SS/PBCH blocks can be transmitted in accordance with a subcarrier spacing, according to an embodiment.

FIG. 10 is a diagram illustrating symbols on which SS/PBCH blocks can be transmitted in accordance with subcarrier spacing, according to another embodiment.

With reference to FIG. 10, the subcarrier spacing may be configured as 15 kHz, 30 kHz, 120 kHz, and 240 kHz, and in accordance with the subcarrier spacing, the location of a symbol in which an SS/PBCH block (or SSB block) can be located may be determined. FIG. 10 illustrates a symbol location 1009 in which the SSB block, in accordance with the subcarrier spacing, can be transmitted on each symbol within 5 ms, and the location in which the SSB block is transmitted may be configured in the terminal through system information or dedicated signaling. It is not necessary for the SS/PBCH block to always be transmitted in the region in which the SS/PBCH block can be transmitted, and the SS/PBCH block may be or may not be transmitted depending on the selection of the base station. Accordingly, the location in which the SSB block is transmitted may be configured in the terminal through the system information or the dedicated signaling.

Herein, a sidelink control channel may be referred to as a physical sidelink control channel (PSCCH), and a sidelink shared channel or a data channel may be referred to as a physical sidelink shared channel (PSSCH). Further, a broadcast channel that is broadcasted together with a synchronization signal may be referred to as a physical sidelink broadcast channel (PSBCH), and a channel for feedback transmission may be referred to as a physical sidelink feedback channel (PSFCH). However, the feedback transmission may be performed using the PSCCH or PSSCH. In accordance with the transmitting communication system, the channel may be referred to as LTE-PSCCH, LTE-PSSCH, NR-PSCCH, or NR-PSSCH. Herein, a sidelink means a link between terminals, and a Uu link means a link between a base station and a terminal.

Figure 11:
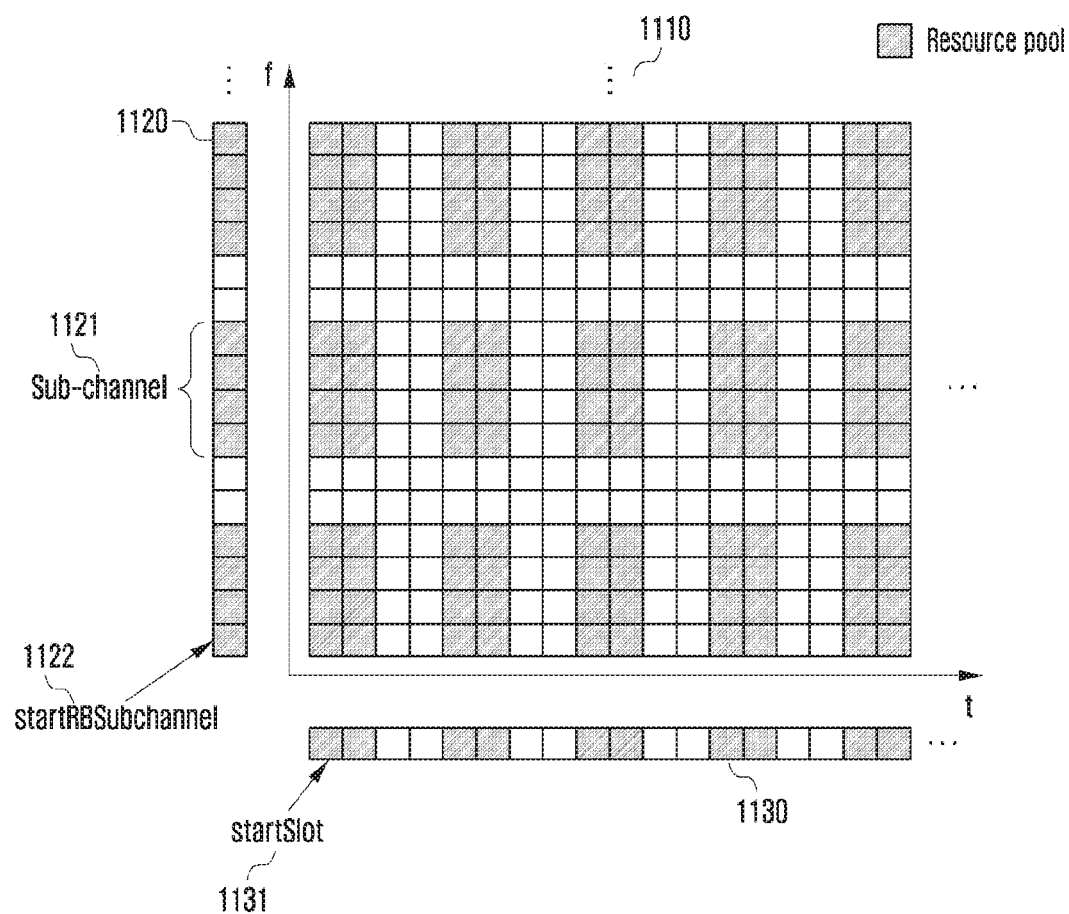
FIG. 11 is a diagram illustrating a resource pool that is defined as a set of resources on time and frequency being used for sidelink transmission and reception, according to an embodiment.

FIG. 11 is a diagram illustrating a resource pool that is defined as a set of resources on time and frequency being used for sidelink transmission and reception, according to an embodiment.

A resource pool 1110 is non-contiguously allocated on time and frequency. Herein, although explanation has been made focused on a case in which a resource pool is non-contiguously allocated on frequency, the resource pool can also be contiguously allocated on the frequency.

"A non-contiguous resource allocation 1120 is performed on the frequency. The granularity of resource allocation on the frequency may be a PRB.

A resource allocation 1121 on the frequency is performed based on a sub-channel. The sub-channel may be defined in the unit on the frequency composed of a plurality of RBs. The sub-channel may be defined as an integer multiple of the RB. The resource allocation 1121 denotes a sub-channel composed of four contiguous PRBs. The size of the sub-channel may be differently configured, and although it is general that one sub-channel is composed of contiguous PRBs, it is not necessary that the sub-channel is composed of the contiguous PRBs. The sub-channel may become the basic unit of resource allocation on a PSSCH or PSCCH, and thus, the size of the sub-channel may be differently configured depending on whether the corresponding channel is the PSSCH or PSCCH. Further, the term "sub-channel" may be replaced by another term, such as a RBG.

A start location of a sub-channel on the frequency in a resource pool is, startRBSubchanel 1122.

The resource block that is a frequency resource that belongs to a resource pool for the PSSCH in an LTE V2X system may be determined in the following method.

The resource block pool consists of $N_{subCH}$ sub-channels where $N_{subCH}$ is given by higher layer parameter numSubchannel.

The sub-channel m for m=0, 1, ..., $N_{subCH}$−1 consists of a set of $n_{subCHsize}$ contiguous resource blocks with the physical resource block number $n_{PRB}=n_{subCHRBstart}+m*n_{subCHsize}+j$ for j=0, 1, ..., $n_{subCHsize}$−1 where $n_{subCHRBstart}$ and $n_{subCHsize}$ are given by higher layer parameters startRBSubchannel and sizeSubchannel, respectively Non-contiguous resource allocation 1130 is performed on time. The granularity of resource allocation on time may be a slot. Herein, although the resource pool is non-contiguously allocated on the time, the resource pool can also be contiguously allocated on the time.

A start location of a slot on time is startSlot 1131. Subframes ($t_0^{SL}$, $t_1^{SL}$, ..., $t_{T_{MAX}}^{SL}$) that are time resources that belong to the resource pool for the PSSCH in the LTE V2X system may be determined in the following method.

$0 \leq t_i^{SL} < 10240$ the subframe index is relative to subframe #0 of the radio frame corresponding to SFN 0 of the serving cell or DFN 0, the set includes all the subframes except the following subframes, subframes in which SLSS resource is configured, downlink subframes and special subframes if the sidelink transmission occurs in a TDD cell, reserved subframes which are determined by the following steps:
1) the remaining subframes excluding $N_{slss}$ and $N_{dssf}$ subframes from the set of all the subframes are denoted by $(l_0, l_1, \ldots, l_{(10240-N_{slss}-N_{dssf}-1)})$ arranged in increasing order of subframe index, where $N_{slss}$ is the number of subframes in which SLSS resource is configured within 10240 subframes and $N_{dssf}$ is the number of downlink subframes and special subframes within 10240 subframes if the sidelink transmission occurs in a TDD cell.
2) a subframe $l_r$ ($0 \leq r < (10240-N_{slss}-N_{dssf})$) belongs to the reserved subframes if $$r = \left\lfloor \frac{m \cdot (10240 - N_{slss} - N_{dssf})}{N_{reserved}} \right\rfloor$$

where m=0, . . . , $N_{reserved}-1$ and $N_{reserved}=(10240-N_{slss}-N_{dssf})$ mod $L_{bitmap}$. Here, $L_{bitmap}$ the length of the bitmap is configured by higher layers.

the subframes are arranged in increasing order of subframe index.

A bitmap $(b_0, b_1, \ldots, b_{L_{bitmap}-1})$ associated with the resource pool is used where $L_{bitmap}$ the length of the bitmap is configured by higher layers.

A sub frame $t_k^{sL}$ ($0 \leq k < (10240-N_{slss}-N_{dssf}-N_{reserved})$) belongs to the subframe pool if $b_{k'}=1$ where k'=k mod $L_{bitmap}$.

Figure 12:
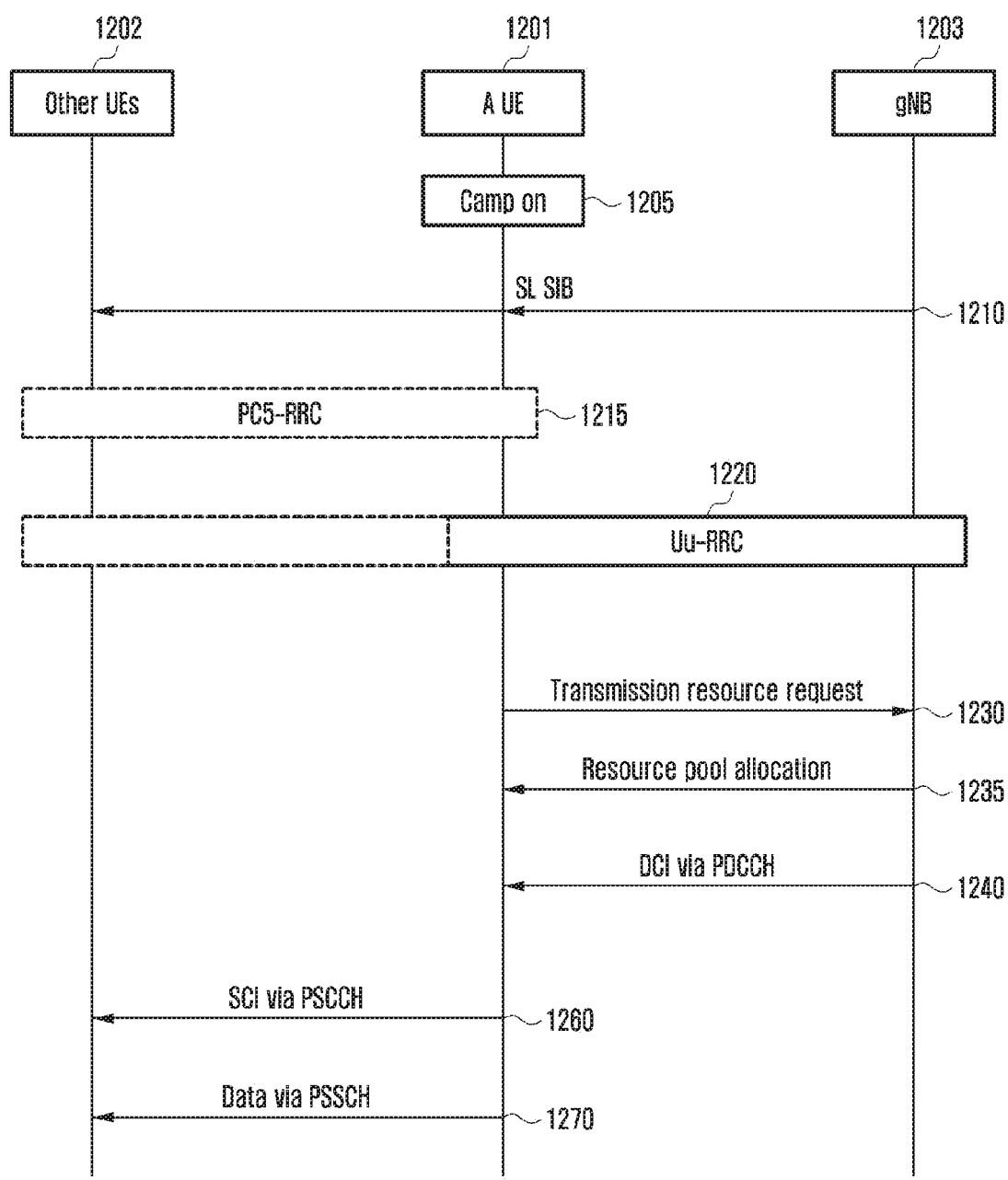
FIG. 12 is a diagram illustrating a scheduled resource allocation (mode 1) method in a sidelink, according to an embodiment.

FIG. 12 is a diagram illustrating a scheduled resource allocation (mode 1) method in a sidelink, according to an embodiment. The scheduled resource allocation (mode 1) is a method in which a base station allocates resources being used for sidelink transmission in a dedicated scheduling method to RRC-connected terminals. The base station can manage the resources of the sidelink, and thus, it may be effective in performing interference management and resource pool management.

In FIG. 12, a terminal 1201 camps on, at 1205, and receives a sidelink system information block (SL SIB) from a base station 1203, at 1210. The system information may include resource pool information for transmission/reception, configuration information for a sensing operation, information for synchronization configuration, and information for inter-frequency transmission/reception. If data traffic for V2X is created, the terminal 1201 performs an RRC connection with the base station, at 1220. The RRC connection between the terminal and the base station may be called a Uu-RRC. The above-described Uu-RRC connection process may be performed before the data traffic is created.

The terminal 1201 requests the base station to provide a transmission resource for performing V2X communication, at 1230. The terminal 1201 may request the transmission resource from the base station using an RRC message or a MAC CE. A SidelinkUEInformation or UEAssistanceInformation message may be used as the RRC message. The MAC CE may be, for example, a buffer status report MAC CE of a new format (including at least an indicator notifying of a buffer status report for V2X communication or information on the size of data being buffered for D2D communication). With respect to the detailed format and the contents of the buffer status report being used in the 3GPP, the 3GPP standards TS36.321 "E-UTRA MAC Protocol Specification" are referred to. The base station 1203 allocates the V2X transmission resource to the terminal 1201 through a dedicated Uu-RRC message. This message may be included in an RRCConnectionReconfiguration message. The allocated resource may be a V2X resource through the Uu or a resource for PC5 depending on the kind of traffic requested by the terminal or the congestion degree of the corresponding link. For the above-described determination, the terminal may additionally send ProSe per packet priority (PPPP) or logical channel ID information of the V2X traffic through UEAssistanceInformation or MAC CE.

Because the base station is also aware of information on resources being used by other terminals, the base station allocates a remaining resource pool among the resources requested by the terminal 1201, at 1235. The base station may indicate the final scheduling to the terminal 1201 by means of DCI transmission through the PDCCH, at 1240.

For broadcast transmission, the terminal 1201 broadcasts sidelink control information (SCI) to other terminals 1202 on the PSCCH without additional RRC configuration of the sidelink, at 1260. Further, the terminal 1201 may broadcast data to other terminals 1202 on the PSSCH, at 1270.

In contrast with this, for unicast and groupcast transmission, the terminal 1201 may perform the RRC connection with other terminals in a one-to-one manner. Here, for discrimination against the Uu-RRC, the RRC connection between the terminals may be referred to as a PC5-RRC. Even in case of the groupcast, the PC5-RRC is individually connected between the terminals in the group, at 1215. Although FIG. 12 illustrates that the connection of the PC5-RRC, at 1215, is performed after 1210, it may be performed any time before 1210 or 1260.

If the RRC connection is necessary between the terminals, the terminal 1201 performs the PC5-RRC connection of the sidelink, at 1215, and transmits the SCI to other terminals 1202 on the PSCCH through the unicast and groupcast, at 1260. The groupcast transmission of the SCI may be construed as the group SCI. Further, the terminal 1201 transmits data to other terminals 1202 on the PSSCH through the unicast and groupcast, at 1270.

Figure 13:
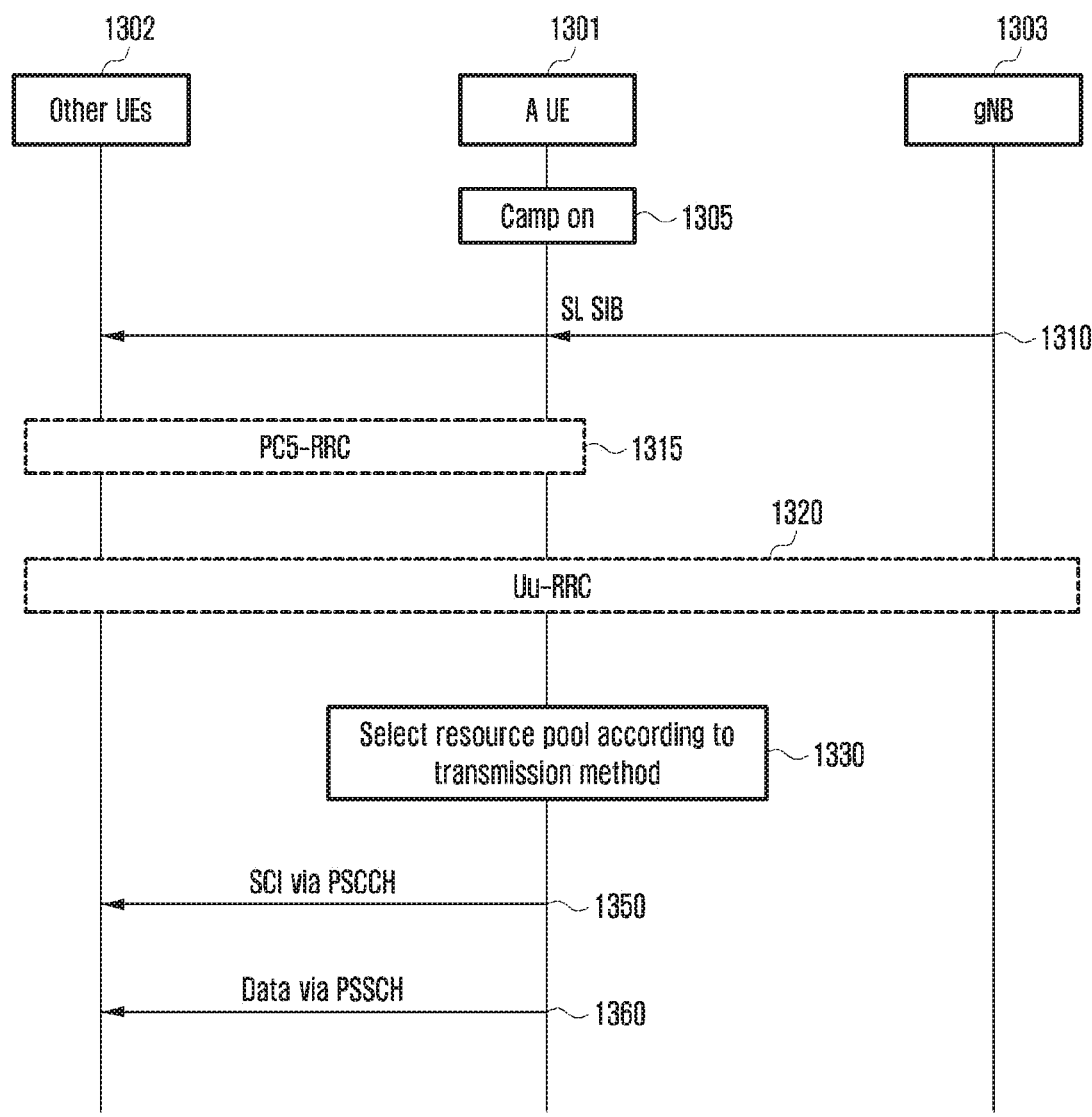
FIG. 13 is a diagram illustrating a UE autonomous resource allocation (mode 2) method in a sidelink, according to an embodiment.

FIG. 13 is a diagram illustrating a UE autonomous resource allocation (mode 2) method in a sidelink, according to an embodiment.

In the UE autonomous resource allocation (mode 2), the base station provides a sidelink transmission/reception resource pool for V2X as system information, and the terminal selects the transmission resource in accordance with a determined rule. The resource selection method may be zone mapping or sensing based resource selection or random selection. In contrast with the scheduled resource allocation (mode 1) method in which the base station directly participates in the resource allocation, the UE autonomous resource allocation (mode 2) method of FIG. 13 is different from the scheduled resource allocation (mode 1) method in that the terminal 1301 autonomously selects the resource based on the resource pool pre-received through the system information, and transmits the data.

In the V2X communication, a base station 1303 allocates various kinds of resource pools (V2X resource pool and V2P resource pool) for a terminal 1301. The resource pool may be composed of a resource pool on which the terminal can autonomously select an available resource pool after sensing the resources being used by other neighboring terminals, and a resource pool on which the terminal randomly selects a resource from a predetermined resource pool.

The terminal 1301 camps on, at 1305, and receives an SL SIB from the base station 1303, at 1310. The system information may include resource pool information for transmission/reception, configuration information for a sensing operation, information for synchronization configuration, and information for inter-frequency transmission/reception. The operation illustrated in FIG. 13 differs greatly from the operation illustrated in FIG. 12 in that for FIG. 12, the base station 1203 and the terminal 1201 operate in an RRC-connected state, whereas for FIG. 13, they may operate even in an idle mode in which the RRC is not connected. Further, even in the RRC-connected state, the base station 1303 does not directly participate in the resource allocation, and may operate so that the terminal autonomously selects the transmission resource. The RRC connection between the terminal and the base station may be referred to as Uu-RRC, at 1320. If data traffic for V2X is created, at 1330, the terminal 1301 selects the resource pool of the time and/or frequency region in accordance with the transmission operation configured among the resource pools transferred from the base station 1303 through the system information.

For the broadcast transmission, the terminal 1301 broadcasts the SCI to other terminals 1302 on the PSCCH through broadcasting without additional RRC configuration of the sidelink, at 1350. Further, the terminal 1201 may broadcast data to other terminals 1302 on the PSSCH, at 1360.

In contrast, when the unicast and groupcast transmission, the terminal 1301 may perform the RRC connection with other terminals in a one-to-one manner, at 1315. Here, for discrimination against the Uu-RRC, the RRC connection between the terminals may be called a PC5-RRC. Even in case of the groupcast, the PC5-RRC is individually connected between the terminals in the group. This connection of the RRC layer in the sidelink may be called the PC5-RRC. Through the PC5-RRC connection, UE capability information for the sidelink may be exchanged between the terminals, or the exchange of configuration information required for the signal transmission/reception may be performed. Although FIG. 13 illustrates that the connection of the PC5-RRC at 1315 is after 1310", it may be performed any time before 1310 or 1350.

If the RRC connection is necessary between the terminals, the terminal 1301 performs the PC5-RRC connection of the sidelink, and transmits the SCI to other terminals 1302 on the PSCCH through the unicast and groupcast, at 1350. The groupcast transmission of the SCI may be construed as the group SCI. Further, the terminal 1301 transmits data to other terminals 1302 on the PSSCH through the unicast and groupcast, at 1360.

In order to effectively perform the sensing in a situation where periodic and aperiodic traffics coexist, sensing window A and sensing window B are defined.

Figure 14A:
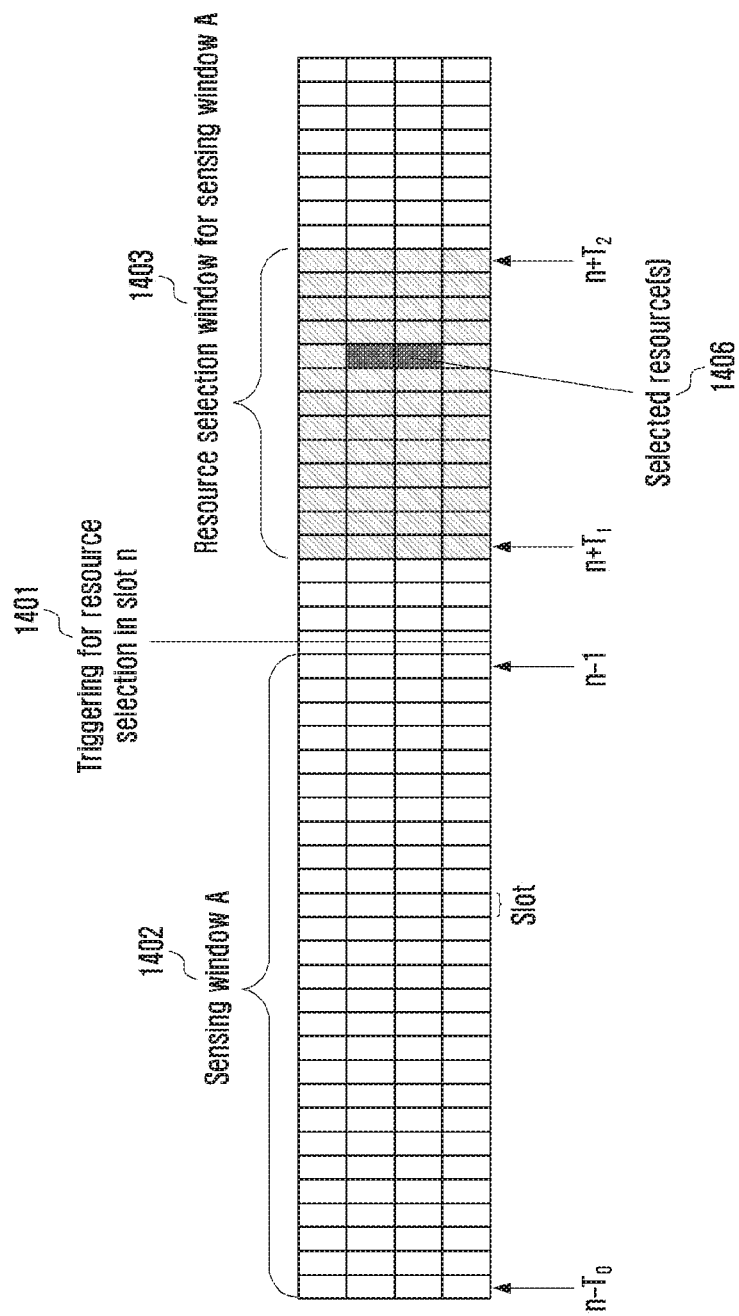
FIG. 14A is a diagram illustrating a method for configuring sensing window A for UE autonomous resource allocation (mode 2) of a sidelink, according to an embodiment.

FIG. 14A is a diagram illustrating a method for configuring sensing window A for UE autonomous resource allocation (mode 2) of a sidelink, according to an embodiment.

As illustrated in 1400 of FIG. 14A, when triggering for selecting a transmission resource occurs in slot n 1401, a sensing window A 1402 may be defined as follows.

Sensing window A 1402 may be defined as a slot section of $[n-T_0, n-1]$. Here, $T_0$ may be determined as a fixed value, and may be determined to be configurable.

As an example of a case in which $T_0$ is determined as a fixed value, it may be indicated as $T_0=1000*2^\mu$ with respect to the periodic traffic. In contrast, $T_0$ may be configured as a fixed value of $T_0=100*2^\mu$ with respect to the aperiodic traffic. As described above, the fixed $T_0$ value may be changed to another value in accordance with the traffic characteristic being considered, and may be fixed to the same value with respect to the periodic and aperiodic traffics. Here, $\mu$ is an index corresponding to numerology, and is configured as the following values in accordance with the subcarrier spacing.

SCS=15 kHz, $\mu=0$
SCS=30 kHz, $\mu=1$
SCS=60 kHz, $\mu=2$
SCS=120 kHz, $\mu=3$

When $T_0$ is determined to be configurable, the configuration for this may be indicated through the SL SIB or UE-specific higher signaling. When indicated through the SL SIB, the corresponding value may be configured within resource pool information among the corresponding system information. If $T_0$ is configured within the resource pool information, always constant $T_0$ is used within the resource pool.

In the sensing window A 1402, SCI decoding and sidelink measurement for another terminal may be performed.

The terminal that performs the sensing may acquire resource allocation information for another terminal and QoS information for a packet from the received SCI within the sensing window A 1402. The resource allocation information may include a reservation interval for the resource. Further, the QoS information may be latency, reliability, and priority information in accordance with the minimum required communication range for the transmitted traffic and data rate requirements. Further, the terminal may acquire location information of another terminal from the received SCI. The terminal may calculate a TX-RX distance from the location information of another terminal and its own location information.

The terminal may measure a sidelink reference signal received power (SL RSRP) from the received SCI within the sensing window A 1402.

The terminal may measure a sidelink received signal strength indicator (SL RSSI) within the sensing window A 1402.

The sensing window A 1402 may be used for the main purpose of determining resources for the UE autonomous resource allocation (mode 2) through sensing of the periodic traffic. The terminal may grasp the periodic resource allocation information of another terminal through the SCI decoding, and if the terminal determines that allocation of the transmission resource to the resource to be used by another terminal is not effective using the result of measuring the sidelink, such as the SL RSRP or SL RSSI, the corresponding resource may be excluded from a resource selection window 1403. As illustrated in FIG. 14A, when the triggering for selecting the transmission resource occurs in slot n, at 1401, the resource selection window 1403 may be defined as follows.

The resource selection window 1403 may be defined as a slot section of $[n+T_1, n+T_2]$. Here, $T_1$ and $T_2$ may be determined as fixed values or may be determined to be configurable. In contrast, $T_1$ and $T_2$ may be determined in a fixed range, and the terminal may configure proper values within the fixed range in consideration of the implementation thereof.

$T_1$ and $T_2$ may be determined in a fixed range, and in consideration of the implementation thereof, the terminal may configure proper values within the fixed range, for example, in the range of $T_1 \leq 4$ and $20 \leq T_2 \leq 100$.

A final transmission resource 1406 may be selected within the resource selection window 1403 using the result of the sensing performed in the sensing window A 1402.

When sensing is performed using only the sensing window A 1402 as illustrated in FIG. 14A, and the transmission resource selection is performed through this, the following transmission resource selection method may be used.

Transmission resource selection method-1
- Step-1: The number $M_{total}$ of resource candidates capable of performing resource allocation is determined based on the resource pool information within the resource selection window 1403.
- Step-2: The terminal excludes resources of which the usage is determined to be ineffective due to occupation by another terminal within the resource selection window 1403 using the sensing result in the sensing window A 1402, and remains $X(\leq M_{total})$ resource candidates capable of performing resource allocation. For this, a method for excluding resources through SCI decoding for another terminal and sidelink measurement may be used.
- Step-3: A resource candidate list X is reported to a higher layer of the terminal, and the final transmission resource among X candidates is randomly selected on the higher layer of the terminal.

Figure 14B:
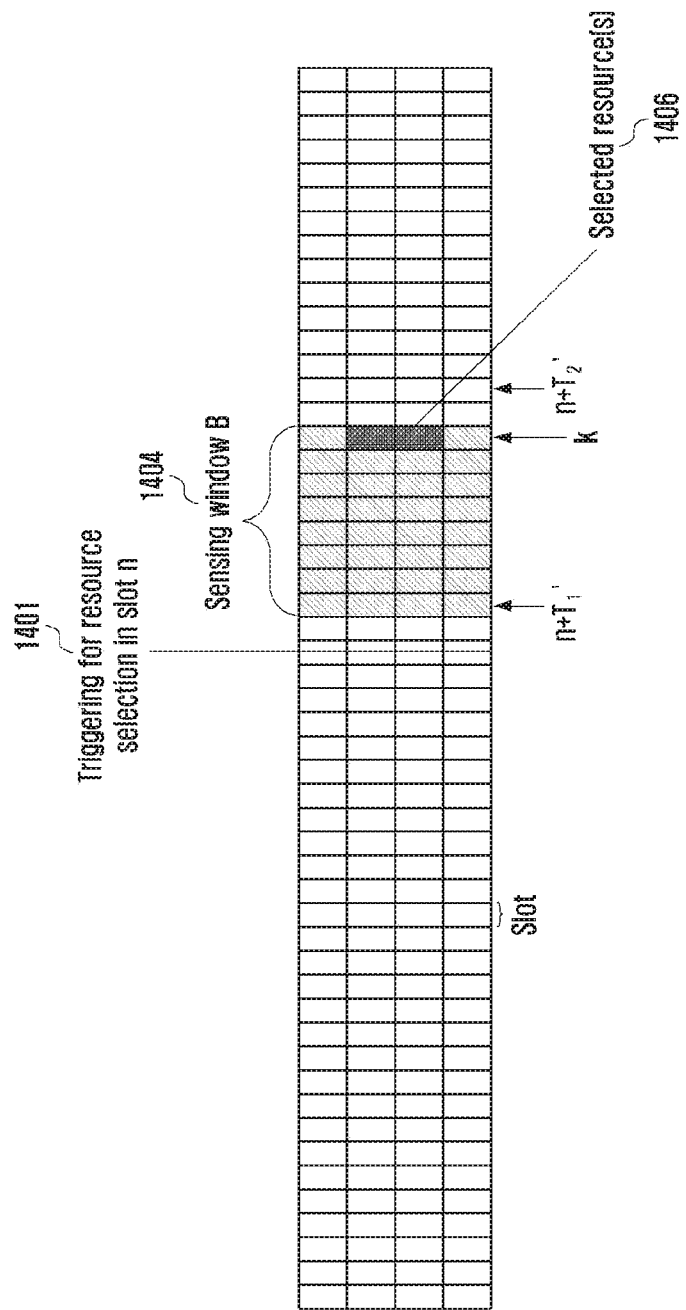
FIG. 14B is a diagram illustrating a method for configuring sensing window B for UE autonomous resource allocation (mode 2) of a sidelink, according to an embodiment.

FIG. 14B is a diagram illustrating a method for configuring sensing window B for UE autonomous resource allocation (mode 2) of a sidelink, according to an embodiment. As illustrated in 1430 of FIG. 14B, when triggering for selecting a transmission resource occurs in slot n 1401, sensing window B 1404 may be defined as follows.

Sensing window B 1404 may be defined as a slot section of $[n+T_1', n+T_2']$. $T_1'$ and $T_2'$ may be determined as fixed values, or may be determined to be configurable. In contrast, $T_1'$ and $T_2'$ may be determined in a fixed range, and the terminal may configure proper values within the fixed range in consideration of the implementation thereof. Further, when k indicates the slot in which the resource is finally selected, the sensing window B is interrupted in k slot, and in this case, the sensing window B becomes $[n+T_1', k]$.

$T_1'$ and $T_2'$ may be configured to have the same values as the values of $T_1$ and $T_2$ of the resource selection window 1403 of FIG. 14A, respectively, or may be configured to have different values.

For example, if $T_1'$ is configured as $T_1'=0$, it means that sensing is performed from a triggering slot n for selecting the transmission resource.

By the configured $T_1'$ and $T_1$ values, the sensing window B may be configured as one slot or more slots.

In the sensing window B 1404, the SCI decoding for another terminal and sidelink measurement may be performed.

Sensing in the sensing window B 1404 is performed.

The sensing window B 1404 may be used for the purpose of determining resources for UE autonomous resource allocation (mode 2) through additional sensing of periodic and aperiodic traffics with respect to the sensing window A. In the sensing window B 1404 configured hereinafter based on a triggering slot n for selecting the transmission resource, it is possible to sense aperiodic traffic that is unable to be predicted in the sensing window A 1402 using the sidelink measurement for the slot to which an actual transmission resource can be allocated. The sensing through the sensing window B 1404 may be understood as an operation of performing the sensing with respect to the traffic sensed for each slot regardless of whether the traffic is periodic or aperiodic. When sensing is performed using the sensing window B 1404 as illustrated in FIG. 14B, and the transmission resource selection is performed through this, the following transmission resource selection method may be used.

Transmission resource selection method-2
- Step-1: It is determined whether a corresponding resource is idle by performing sensing in the corresponding slot within the sensing window B 1404.

The resource allocation unit on frequency may be defined as A ($\geq 1$) sub-channels or all sub-channels. The number $N_{total}$ of resource candidates capable of performing resource allocation within the corresponding slot is determined in accordance with the resource allocation unit on the frequency.

The sensing may be performed through SCI decoding and sidelink measurement.

- Step-2-1: If it is determined that the corresponding resource is idle through the sensing in Step-1 as described above, the final transmission resource 1406 among the number $N_{total}$ of resource candidates capable of performing resource allocation within the corresponding slot is determined.
- Step-2-2: If it is determined that all the corresponding resources are busy through the sensing in Step-1 as described above, the following operation may be selected.

If the next slot is also configured as the sensing window B 1404, the operation skips to the next slot, and Step-1 as described above is performed.

If the next slot is not configured to the sensing window B 1404, the following operation may be considered.

In the current slot, the final transmission resource 1406 is determined using QoS information or the result of energy detection. The QoS information may be priority information in accordance with at least one of priority, latency, reliability, proximity service PPPP, ProSe per-packet reliability (PPPR), minimum required communication range for traffic being transmitted, or data rate requirements. The priority may mean to include the PPPP and the PPPR, and may be a value selected within a range of predetermined values, and data that is necessary to be transmitted in the sidelink may have one priority value.

The transmission in the current slot may be canceled, and a backoff operation may be performed.

As defined through FIGS. 14A and 14B, the sensing window A and the sensing window B may be divided based on a time point where triggering for selecting the transmission resource comes down. Specifically, based on the triggering slot n for selecting the transmission resource, the previously configured sensing section may be defined as the sensing window A 1402, and the sensing section configured thereafter may be defined as the sensing window B 1404.

Figure 14C:
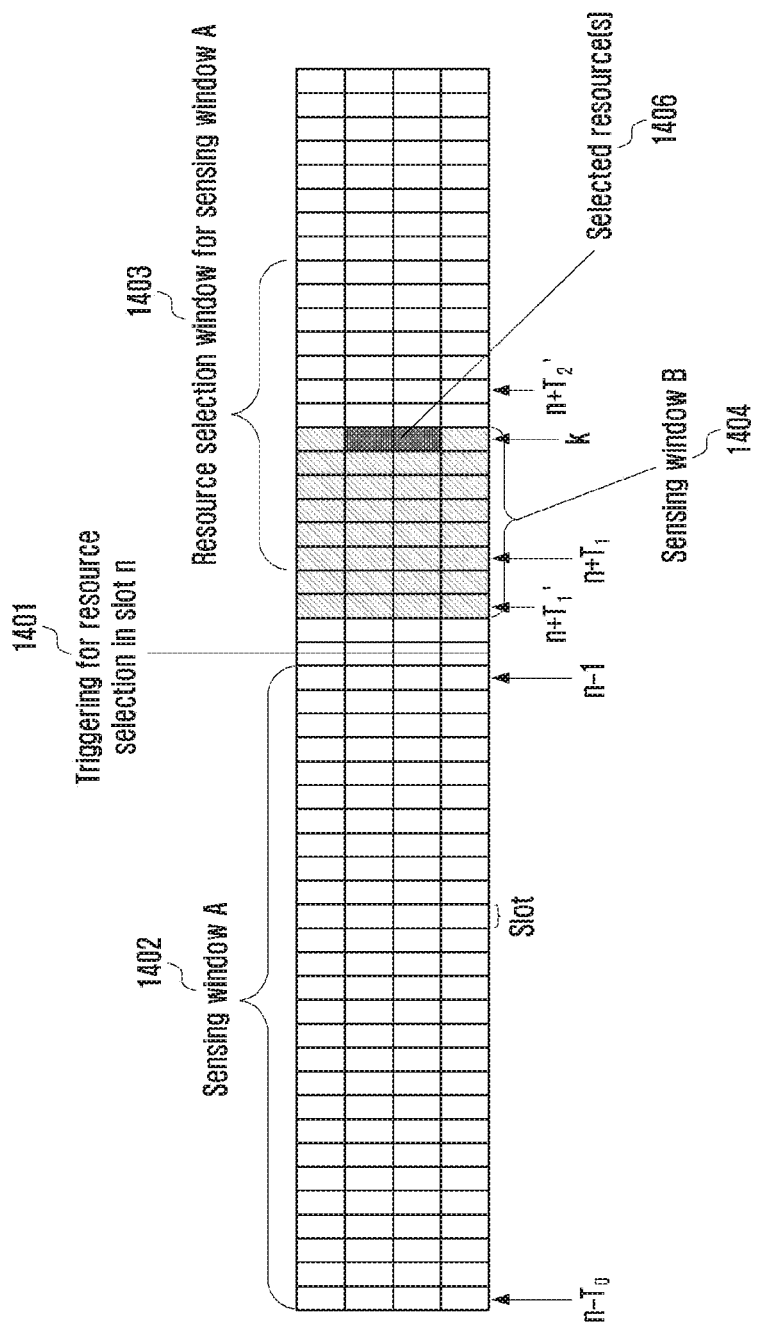
FIG. 14C is a diagram illustrating a method for configuring sensing window A and sensing window B for UE autonomous resource allocation (mode 2) of a sidelink, according to an embodiment.

FIG. 14C is a diagram illustrating a method for configuring sensing window A and sensing window B for UE autonomous resource allocation (mode 2) of a sidelink, according to an embodiment. In 1460 of FIG. 14C, sensing window A and sensing window B are simultaneously configured. When the triggering for selecting the transmission resource occurs in slot n 1401, the sensing window A 1402 and the sensing window B 1404 may refer to the above-described definition. When the sensing is performed using both the sensing window A 1402 and sensing window B 1404, as illustrated in FIG. 14C, and the transmission resource selection is performed, the following transmission resource selection method may be used.

Transmission resource selection method-3
- Step-1: The number $M_{total}$ of resource candidates capable of performing resource allocation is determined based on the resource pool information within the resource selection window 1403.
- Step-2: The terminal performing the sensing excludes resources of which the usage is determined to be ineffective due to occupation by another terminal within the resource selection window 1403 using the sensing result in the sensing window A 1402, and remains X ($\leq M_{total}$) resource candidates capable of performing resource allocation. SCI decoding for another terminal and sidelink measurement may be used to exclude the resources.
- Step-3: A resource candidate list X is reported to a higher layer of the terminal, and Y candidates among X candidates are randomly down-selected on the higher layer of the terminal.
- Step-4-1: If the sensing window B 1404 is included in the resource selection window 1403, the terminal selects the final transmission resource 1406 among Y candidates determined on the higher layer by the transmission resource selection method-2 using the sensing result of the sensing window B 1404 on the physical layer.

If the sensing window B 1404 is included in the resource selection window 1403, this corresponds to a section of [n+$T_1$, k] in FIG. 14C. Such a condition may be determined by the configuration of $T_1$ and $T_2$, and $T_1'$ and $T_2'$.
- Step-4-2: If the sensing window B 1404 is not included in the resource selection window 1403, the final transmission resource 1406 is selected by the transmission resource selection method-2 using the sensing result in the sensing window B on the physical layer.

When the sensing window B 1404 is not included in the resource selection window 1403 corresponds to a section of [n+$T_1'$, n+$T_1$−1] in FIG. 14C. Such a condition may be determined by the configuration of $T_1$ and $T_2$, and $T_1'$ and $T_2'$.

In the transmission resource selection method-e, the selection of Y candidates on the higher layer may be omitted, and the following method may be used.

Transmission resource selection method-4
- Step-1: The number $M_{total}$ of resource candidates capable of performing resource allocation is determined based on the resource pool information within the resource selection window 1403.
- Step-2: The terminal performing the sensing excludes resources of which the usage is determined to be ineffective due to occupation by another terminal within the resource selection window 1403 using the sensing result in the sensing window A 1402, and remains X ($\leq M_{total}$) resource candidates capable of performing resource allocation. SCI decoding for another terminal and sidelink measurement may be used to exclude the resources.
- Step-3-1: If the sensing window B 1404 is included in the resource selection window 1403, the terminal selects the final transmission resource 1406 among X candidates by the transmission resource selection method-2 using the sensing result of the sensing window B 1404 on the physical layer.

If the sensing window B 1404 is included in the resource selection window 1403, this corresponds to a section of [n+$T_1$, k] in FIG. 14C. Such a condition may be determined by the configuration of $T_1$ and $T_2$, and $T_1'$ and $T_2'$.
- Step-3-2: If the sensing window B 1404 is not included in the resource selection window 1403, the final transmission resource 1406 is selected by the transmission resource selection method-2 using the sensing result in the sensing window B on the physical layer.

The sensing window B 1404 not being included in the resource selection window 1403 corresponds to a section of [n+$T_1'$, n+$T_1$−1] in FIG. 14C. Such a condition may be determined by the configuration of $T_1$ and $T_2$, and $T_1'$ and $T_2'$.

If the sensing window A 1402 and the sensing window B 1404 are simultaneously configured, the final resource selection may be determined by the resource selection window 1403 and the sensing window B 1404. The transmission resource selection method-3 and the transmission resource selection method-4 are methods for performing the sensing in a situation where the periodic and aperiodic traffics coexist by simultaneously configuring the sensing window A 1402 and the sensing window B 1404 and optimizing the selection of the transmission resource through the sensing.

The sensing and the transmission resource selection in the UE autonomous resource allocation (mode 2) of the sidelink as described above may be implemented in various methods. For example, when simultaneously configuring the sensing window A 1402 and the sensing window B 1404, if the triggering for selecting the transmission resource occurs in slot n in a state where the terminal is always performing the sensing for the sensing window A 1402, the terminal may be implemented to select the final transmission resource by sensing the sensing window B 1404. However, the terminal, which always performs the sensing for the sensing window A 1402, can immediately use the sensing result of the sensing window A 1402 anytime, and thus, it has the advantage on the side of the latency in selecting the transmission resource, but it has the disadvantage on the side of energy consumption.

Accordingly, as another method, the terminal may be implemented to immediately perform the sensing for the sensing window A 1402 if a traffic to be transmitted occurs, and to select the final transmission resource by performing the sensing for the sensing window B 1404 after performing triggering for selecting the transmission resource. The latter method has the advantage that it can minimize the energy consumption of the terminal, but has the disadvantage on the side of the latency in selecting the transmission resource.

From the foregoing, an example has been described, in which an empty frequency-time resource is searched for the communication between the terminals in the sidelink, and the signal is transmitted on the searched resources. However, the method and the apparatus provided in the disclosure are not limited thereto, and can be applied to various channel occupation and channel reservation methods.

Figure 15:
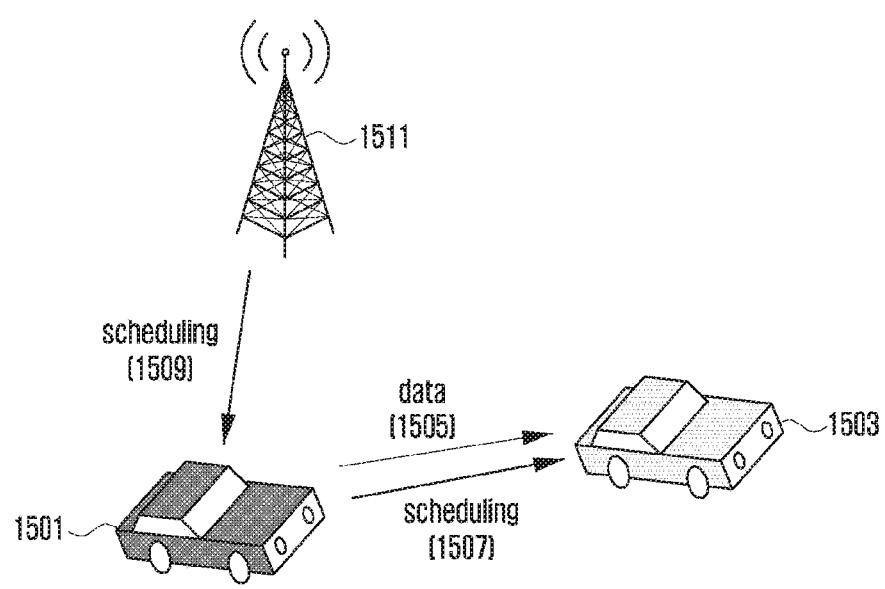
FIG. 15 is a diagram illustrating a mode 1 method for performing sidelink data transmission through reception of scheduling information from a base station, according to an embodiment.

FIG. 15 is a diagram illustrating a mode 1 method for performing sidelink data transmission through reception of scheduling information from a base station as illustrated in FIG. 12, according to an embodiment. A method for receiving scheduling information from a base station and performing sidelink communication based on the scheduling information is referred to as mode 1.

A terminal 1501 intended to perform transmission in a sidelink receives scheduling information 1509 for sidelink communication from a base station 1511. The terminal 1501 intended to perform transmission in the sidelink may be referred to as a transmitting terminal, and a terminal 1503 performing data reception in the sidelink may be referred to as a receiving terminal. However, the transmitting terminal 1501 and the receiving terminal 1503 may be able to perform both data transmission and reception in the sidelink. The scheduling information 1509 for the sidelink communication may be obtained through reception of DCI transmitted by the base station 1511, and the DCI may include following information.

Carrier indicator: used for the purpose of scheduling the sidelink of another carrier in a situation where carrier aggregation (CA) is applied.

Lowest index of sub-channel allocation for initial transmission: used for frequency resource allocation of the initial transmission.

Information to be included in sidelink control information
This may include frequency resource allocation information, the frequency resource allocation information for initial transmission and retransmission, and resource allocation for subsequent N-times transmission or resource reservation information.

Time interval information between initial transmission and retransmission

This may include information on the sidelink slot structure, and information on what slot and what symbols can be used for the sidelink.

This may include HARQ-ACK/CSI feedback timing information, and timing information for transmitting HARQ-ACK or CSI feedback in the sidelink to the base station.

Addressee ID: ID information on what terminals are to receive information

Quality-of-Service (QoS) information such as priority: Information on what priority data is to be transmitted with The scheduling may be used for one sidelink transmission, or may be used for periodic transmission, semi-persistent scheduling (SPS), or configured grant. The scheduling methods may be discriminated by an indicator included in the DCI, RNTI scrambled in a CRC added to the DCI, or ID value. Zero (0) bit may be additionally added to the DCI to make the size of the DCI equal to the size of other DCI formats, such as DCI for downlink scheduling or uplink scheduling.

The transmitting terminal 1501 receives the SCI for sidelink scheduling from the base station 1511, transmits a PSCCH including the sidelink scheduling information 1507, and transmits a PSSCH that is the corresponding data 1505. The sidelink scheduling information 1507 may be SCI, and the SCI may include the following information.

HARQ process number: HARQ process ID for HARQ-related operation of data being transmitted.

New data indicator (NDI): Information on whether the currently transmitted data is new data.

Redundancy Version: Information on what parity bit is to be sent when mapping is performed through channel coding of data.

Layer-1 source ID: ID information on a physical layer of a sending terminal.

Layer-1 destination ID: ID information on a physical layer of a receiving terminal.

Frequency-domain resource assignment for scheduling PSSCH: Frequency-domain resource configuration information of data being transmitted.

MCS: modulation order and coding rate information.

QoS indication: indicates a priority, target latency/delay, target distance, and target error rate.

Antenna port(s): Antenna port information for data transmission.

DMRS sequence initialization: information on an ID value for initialization of a DMRS sequence.

PTRS-DMRS association: information on PTRS mapping.

CBGTI: utilized as an indicator for code block group (CBG) unit retransmission.

Resource reservation: Information for resource reservation.

Time gap between initial transmission and retransmission: Time interval information between initial transmission and retransmission.

Retransmission index: Indicator for discriminating retransmission.

Transmission format/cast type indicator: Discrimination indicator of a transmission format or unicast/groupcast/broadcast.

Zone ID: Location information of a transmitting terminal.

NACK distance: Reference indicator determining whether a receiving terminal transmits HARQ-ACK/NACK.

HARQ feedback indication: indicates whether a feedback is to be transmitted or whether the feedback is being transmitted.

Time-domain resource assignment for scheduling PSSCH: Time-domain resource information of sidelink data being transmitted.

Second SCI indication: Indicator including mapping information of the second SCI for 2-stage control information.

DMRS pattern: DMRS pattern (e.g., DMRS-mapped symbol location) information.

The control information may be included in one SCI to be transmitted to the receiving terminal, or may be included in two SCIs to be transmitted. The transmission of the control information through two SCIs may be called a 2-stage SCI method.

The disclosure provides a method in which a terminal having received data in a sidelink transmits a feedback including an HARQ-ACK feedback and a method and an apparatus in which a terminal having transmitted data receives a feedback including an HARQ-ACK feedback.

First Embodiment

In a first embodiment, a method and an apparatus are provided, in which a terminal having received data configures an HARQ-ACK feedback. A method is provided for determining the size of an HARQ-ACK codebook regardless of whether actual sidelink data is transmitted and in accordance with pre-configuration, and a method is provided for determining the size of an HARQ-ACK codebook based on whether actual sidelink data is transmitted.

Figure 16:
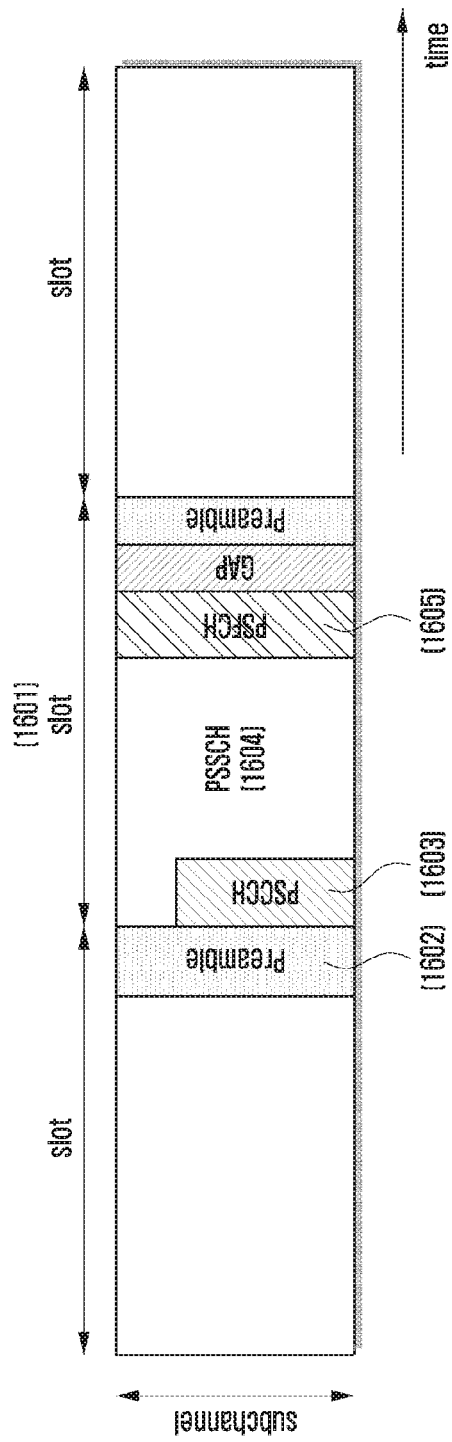
FIG. 16 is a diagram illustrating a mapping structure of physical channels mapped onto one slot on a sidelink, according to an embodiment.

FIG. 16 is a diagram illustrating a mapping structure of physical channels mapped onto one slot on a sidelink, according to an embodiment.

A transmitting terminal transmits a preamble signal 1602 on one or more symbols before transmitting a corresponding slot 1601. The preamble signal 1602 may be used by a receiving terminal to properly perform an automatic gain control (AGC) for adjusting the level of amplification when amplifying a power of a received signal. Further, whether to transmit the preamble signal 1602 may be determined depending on whether the transmitting terminal has transmitted the previous slot of the corresponding slot 1601. That is, when the corresponding transmitting terminal transmits a signal to the same terminal as in the previous slot, the preamble transmission may be omitted.

A PSCCH 1603 including control information may be transmitted on initial symbols of a slot. A PSSCH 1604 being scheduled by the control information of the PSCCH may be transmitted on the initial symbols. Apart of SCI that is the control information may be mapped onto the PSSCH to be transmitted. Further, FIG. 16 illustrates an example in which a physical sidelink feedback channel (PSFCH) 1605 that is a physical channel on which feedback information is transmitted is located at the last part of the slot. The terminal enables the terminal having transmitted/received the PSSCH to prepare for transmission or reception of the PSFCH by securing a predetermined empty time between the PSSCH 1604 and the PSFCH 1605. After the transmission/reception of the PSFCH 1605, the terminal may secure a section emptied for a predetermined time.

The terminal may be preconfigured with the location of the slot in which the PSFCH can be transmitted. The term "preconfigured" may mean "predetermined" in the terminal preparation process, "transferred" when a sidelink-related system is accessed, "transferred" from the base station when the base station is accessed, or "transferred" from another terminal.

Figure 17:
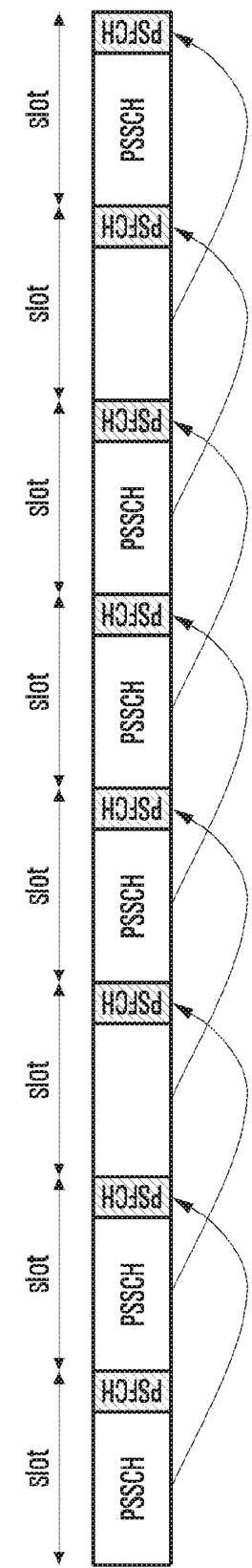
FIG. 17 is a diagram illustrating a resource capable of transmitting and receiving a PSFCH for each slot is configured, according to an embodiment.

FIG. 17 is a diagram illustrating a resource capable of transmitting and receiving a PSFCH for each slot, according to an embodiment.

If it is possible to configure a period of resources capable of transmitting and receiving the PSFCH by a parameter, such as periodicity_PSFCH_resource, FIG. 17 illustrates a case where periodicity_PSFCH_resource=1 slot. Further, it may be possible for the period to be configured in units of milliseconds (ms), and a PSFCH resource to be configured in each slot in accordance with the SCS.

Figure 18:
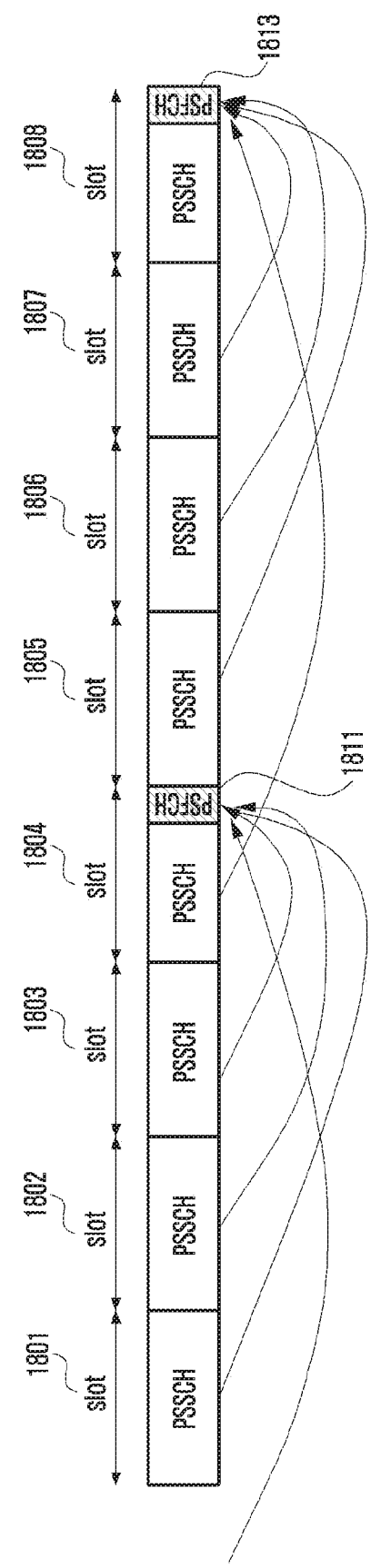
FIG. 18 is a diagram illustrating a resource capable of transmitting and receiving a PSFCH every four slots is configured, according to an embodiment.

FIG. 18 is a diagram illustrating a resource capable of transmitting and receiving a PSFCH every four slots, according to an embodiment.

As shown in FIG. 18, only a last slot 1804 among four slots 1801, 1802, 1803, and 1804 is configured to be able to transmit and receive a PSFCH 1811. In a similar manner, only a last slot 1808 among four slots 1805, 1806, 1807, and 1808 is configured to be able to transmit and receive a PSFCH 1813. The index of the slot may be a slot that is determined in a resource pool. That is, the four slots 1801, 1802, 1803, and 1804 may not be physically contiguous slots, but may be contiguously appearing slots among slots belonging to the resource pool (or slot pool) that is used by a transceiver.

Arrows in FIG. 18 indicate slots on the PSFCH on which HARQ-ACK feedback information of the PSSCH is transmitted. The HARQ-ACK information of the PSSCH being transmitted in slots 1801, 1802, and 1803 may be included in the PSFCH capable of being transmitted in slot 1804. In a similar manner, the HARQ-ACK information of the PSSCH being transmitted in slots 1804, 1805, 1806, and 1807 may be included in the PSFCH capable of being transmitted in slot 1808. The reason why the HARQ-ACK feedback information of the PSSCH transmitted in slot 1804 is unable to be transmitted in the same slot 1804 is that there is not enough time for the terminal to transmit the PSFCH for the PSSCH in the slot 1804 after completing decoding of the PSSCH transmitted in the same slot 1804. That is, the minimum processing time required to prepare the PSFCH after processing the PSSCH is not small enough.

In order to properly perform the transmission/reception of the PSFCH, it is necessary to know the number of HARQ-ACK feedback bits included in the PSFCH. Determination of the number of HARQ-ACK feedback bits included in the PSFCH and of which PSSCH the HARQ-ACK bits are included may be performed based on at least one or more combinations of the following parameters.

- Slot period in which the PSFCH can be transmitted and received by parameters such as periodicity_PSFCH_resource
- Whether to bundle HARQ-ACK. HARQ-ACK bits of the PSSCH transmitted in a predetermined number of slots before the PSFCH transmission and reception may have values determined through an AND operation (i.e., when bundling is applied, even if one is NACK, NACK is determined as a whole).
- The number of transport blocks (TBs) included in PSSCH
- Whether to use and configure retransmission in the unit of a code block group (CBG)
- Whether to activate HARQ-ACK feedback
- The number of PSSCHs actually transmitted and received
- Minimum processing time of a terminal for PSSCH processing and PSFCH transmission preparation Slots in which the terminal should transmit the HARQ-ACK may be calculated using the following method. If a PSFCH transmission/reception resource is configured to be located every N slots, the HARQ-ACK for the PSSCH transmitted in slot n is transmitted in the slot having the index of $\lceil(n+1)/N\rceil \times N$.

Herein, $\lceil x \rceil$ means the smallest integer among integers that are larger than x. The above-described formula may be a formula determined to perform an embodiment of FIG. 18. The above-described formula can be used to be replaced by a formula $n+N-\mod(n,N)$.

Herein, mod(a,b) means a remainder obtained by dividing a by b. For example, if N is N=4, HARQ-ACK bits of the PSSCH transmitted in slots n=4, 5, 6, and 7 may be transmitted using the PSFCH in slot 8. The above-described equation can be normalized and applied as follows. If the PSFCH transmission/reception resource is located every N slots, the HARQ-ACK for the PSSCH transmitted in slot n is transmitted in a slot having an index of $\lceil(n+\Delta)/N\rceil \times N$.

The above-described formula can be used to be replaced by the formula $n+N+\Delta-1-\mod(n+\Delta-1,N)$.

Here, $\Delta$ is a parameter that means a gap between the PSSCH received by the terminal and the transmission slot of the HARQ-ACK, and may be configured for each resource pool, may be a pre-configured value, or may be understood as the same value between the terminals through the PC5-RRC configuration. As described above, the $\Delta$ value may be differently defined in accordance with the SCS, and for example, may be a value that is determined or configured as in Table 9 below.

TABLE 9

| SCS | $\Delta$ |
|---|---|
| 15 kHz | 1 |
| 30 kHz | 1 |
| 60 kHz | 2 |
| 120 kHz | 2 |

The proposed $\Delta$ value may be variously modified and applied.

The HARQ-ACK timing method may be provided as follows. If the PSFCH transmission/reception resource is configured to be located every N slots, the PSFCH being transmitted in slot n includes the HARQ-ACK feedback information of the PSSCH transmitted in slots n−N, n−N+1, . . . , n−2, n−1.

That is, the PSFCH may include the HARQ-ACK feedback information of the PSSCH transmitted in N slots before the slot n. In FIG. 18, in the PSFCH being transmitted in slot n, the HARQ_ACK feedback information for the PSSCH being transmitted in slots n−1, n−2, n−3, and n−4 may be included. The above-described method can be normalized and applied in the following method. That is, it may mean that the PSFCH including the HARQ-ACK feedback for the PSSCH transmitted in slots n−N−Δ+1, n−N−Δ+2, . . . , n−Δ−1, n−Δ is transmitted in slot n.

The above-described method may be applied to secure a time corresponding to about at least Δ slots as the time for the terminal to process the PSSCH and to prepare the PSFCH. If the PSCCH or PSSCH is not received in the corresponding slot, the receiving terminal may determine the HARQ-ACK value as a fixed value, such as "0". As described above, the Δ is the parameter that means the gap between the PSSCH received by the terminal and the transmission slot of the HARQ-ACK, and may be configured for each resource pool, may be a pre-configured value, or may be understood as the same value between the terminals through the PC5-RRC configuration. Further, the Δ may be differently defined in accordance with the transmission type, such as the unicast or groupcast.

Second Embodiment

The second embodiment provides a method and an apparatus for determining a HARQ-ACK codebook based on SCI being transmitted from a transmitting terminal.

The transmitting terminal may transmit a PSCCH for scheduling a PSSCH to transmit the PSSCH, and SCI including scheduling information may be mapped onto the PSCCH. The SCI may include the following information.

Sidelink assignment index (SAI): an indicator indicating which PSSCH for configuring the HARQ-ACK codebook is transmitted in a sidelink and indicating how many PSSCHs are configured in one HARQ-ACK codebook to be transmitted on one PSFCH.

As described above, an SAI bit field may or may not exist in the SCI depending on the HARQ-ACK codebook configuration information. Further, a part of the SAI bit field may mean the order of PSSCHs in one codebook, such as a counter, in accordance with the configuration information, and the remaining bits may be used as information indicating the size of the codebook. Further, the whole SAI bit field information may mean the order of HARQ-ACK bit values of the corresponding scheduled PSSCHs in accordance with the configuration information.

Third Embodiment

The third embodiment provides a method and an apparatus for applying different timing parameters in accordance with the processing capability of a terminal when applying the first embodiment.

The terminal may process the SL-SCH included in the PSSCH or data during reception of the PSSCH, and the processing may include channel estimation, modulation or demodulation, and channel code decoding of data. In processing the data, a terminal having a high processing capability may require a short time required to perform the decoding of the data. In contrast, a terminal having a low processing capability may require a long time required to perform the decoding of the data. Accordingly, the timing to transmit the feedback of the data may differ depending on the processing capability of the terminal.

As described above in the first embodiment, if the PSFCH transmission/reception resource is configured to be located every N slots, the HARQ-ACK for the PSSCH transmitted in slot n may be transmitted in a slot having an index of $\lceil (n+\Delta)/N \rceil \times N$.

The above-described formula can be used to be replaced by the formula $n+N+\Delta-1-\mathrm{mod}(n+\Delta-1,N)$.

Here, is a parameter that means a gap between the PSSCH received by the terminal and the transmission slot of the HARQ-ACK, and may be a value that is determined or configured in accordance with the processing time capability of the terminal, that is, the capability of how fast the terminal can process the PSSCH. In the above-described formula, the Δ value may be determined as 2 with respect to the terminal capable of performing normal processing (in the disclosure, it may be referred to as "capability type 1"), whereas in the above-described formula, the Δ value may be determined as 1 with respect to the terminal capable of performing fast processing (in the disclosure, it may be referred to as "capability type 2"). For example, the Δ value may be provided as in Table 10 below. The information on the processing capability of the terminal may be exchanged between the terminals using the PC5-RRC.

TABLE 10

| SCS | Δ for Processing Capability Type 1 | Δ for Processing Capability Type 2 |
|---|---|---|
| 15 kHz | 2 | 1 |
| 30 kHz | 2 | 1 |
| 60 kHz | 3 | 2 |
| 120 kHz | 3 | 2 |

Embodiment 3-1

Embodiment 3-1 provides a method for determining the number of HARQ-ACK bits or the size of the HARQ-ACK codebook and a time to transmit the feedback when the terminal intends to transmit the HARQ-ACK on the PSFCH in a state where the PSFCH resource does not exist for each slot and N (N is an integer larger than "1") is configured.

If the resource capable of transmitting the PSFCH is configured or given in slot n+x when the terminal receives the PSSCH in slot n, the terminal receiving the PSSCH maps the HARQ-ACK feedback information of the PSSCH onto the PSFCH in slot n+x to be transmitted using x which is the smallest one of integers that are equal to or larger than A. As described above, Δ may be a value preconfigured by the transmitting terminal or may be a value configured in the resource pool from which the corresponding PSSCH or PSFCH is transmitted. For the configuration, each terminal may pre-exchange its own capability with the transmitting terminal. As provided in Table 10, Δ may be a value determined in accordance with at least one of the SCS, the terminal capability, configuration value with the transmitting terminal, or the resource pool configuration.

According to the above-described method, when N is N=2, and Δ is "1", that is, when the PSFCH transmission resource is configured every N slots in the resource pool, and the HARQ-ACK of the PSSCH can be transmitted in the slot after the minimum Δ=1 from the transmission of the PSSCH (i.e., in this case, just next slot), the slot in which the HARQ-ACK feedback is transmitted may be determined as in FIG. 19. FIG. 19 is a diagram illustrating the terminal transmitting the HARQ-ACK feedback, according to an embodiment.

Regarding FIG. 19, the number of HARQ-ACK feedback bits that should be transmitted by the terminal may be 2 bits on all PSFCHs. For example, when the receiving terminal is unable to receive the transmitted PSSCH, or is unable to receive the PSCCH for scheduling the PSSCH both in slot n and in slot n+2, it is not necessary to transmit the PSFCH including the HARQ-ACK feedback information in slot n+3. Further, when the receiving terminal has received the transmitted PSSCH in slot n+3, but is unable to receive the transmitted PSSCH or is unable to receive the transmitted PSCCH for scheduling the PSSCH in slot n+4, the receiving terminal will be able to transmit one bit of the HARQ-ACK information for slot n+3 in slot n+8. Further, when the receiving terminal has received the transmitted PSSCH in slot n+3, but is unable to receive the transmitted PSSCH or is unable to receive the transmitted PSCCH for scheduling the PSSCH in slot n+4, the receiving terminal will be able to transmit the HARQ-ACK information for slot n+3 and the HARQ-ACK information for slot n+4 in slot n+8. In this case, because the receiving terminal is unable to receive the PSSCH in slot n+4, the receiving terminal will be able to transmit the feedback through configuration of the HARQ-ACK feedback for slot n+4 to NACK.

That is, when transmitting the PSFCH in a specific slot in consideration of the slot included in the resource pool and the slot in which the PSFCH resource is configured, the period N in which the PSFCH resource is configured, and the $\Delta$ is configured or determined in accordance with the processing time of the terminal, the receiving terminal may determine the number of HARQ-ACK feedback bits to be included in the PSFCH. The number of HARQ-ACK feedback bits may be determined by Equation (2) below.

The number of HARQ-ACK bits to be included in PSFCH being transmitted in slot $n$=the number of slots included in a corresponding resource pool among slot $(k-\Delta+1)$ to slot $(n-\Delta)$     (2)

In Equation (2), slot k may be a slot including a PSFCH resource configured to be able to be transmitted just before the PSFCH that can be transmitted in slot n.

Accordingly, if N and $\Delta$ are given, the maximum number of HARQ-ACK feedback bits to be transmitted by the terminal on one PSFCH may be determined as illustrated in FIG. 20. FIG. 20 is a diagram illustrating the maximum number of HARQ-ACK feedback bits that a terminal should transmit on one PSFCH, according to an embodiment.

That is, in FIG. 20, the terminal may transmit HARQ-ACK feedback bits as many as the number of corresponding slots on the PSFCH in slot n in consideration of slot (n−$\Delta$—N+1−$\Delta$+1) to slot (n−$\Delta$). Of course, if the terminal is unable to receive even one transmitted PSSCH or is unable to receive the transmitted PSCCH for scheduling the PSSCH in slot (n−$\Delta$—N+1−$\Delta$+1) to slot (n−$\Delta$), it may not necessary for the terminal to transmit the PSFCH in slot n. If the N and $\Delta$ are given as described above, the maximum number of HARQ-ACK feedback bits that should be transmitted by the terminal on one PSFCH may be given as in Equation (3) below.

The maximum number of HARQ-ACK feedback bits that should be transmitted by the terminal on one PSFCH=$N+\Delta-1$     (3)

As an example, when N is N=2, and $\Delta$ is "2", that is, when the PSFCH transmission resource is configured every N slots in the resource pool, and the terminal can transmit the HARQ-ACK of the PSSCH in the slot after the minimum $\Delta$=2 from the reception of the PSSCH (i.e., after 2 slots, or the slot after next), the slot in which the HARQ-ACK feedback is transmitted may be determined as in FIG. 21. FIG. 21 is a diagram illustrating the terminal transmitting the HARQ-ACK feedback, according to another embodiment.

That is, with reference to FIG. 21, the number of HARQ-ACK feedback bits that should be transmitted by the terminal may be 1 bit, 2 bits, or 3 bits in accordance with the slot. For example, the terminal will be able to transmit, in slot n+8, the PSFCH including the HARQ-ACK feedback information as in slot n+2, slot n+3, and slot n+4. When receiving control information for scheduling at least one PSSCH in slot n+2, slot n+3, and slot n+4, the terminal includes 3-bit HARQ-ACK feedback information in the PSFCH to be transmitted, and in the slot in which the PSSCH is unable to be received, the terminal may configure the feedback information to NACK to be transmitted.

Accordingly, when transmitting the feedback through sidelink unicast or groupcast communication, the number of feedback bits may be determined as $N+\Delta-1$ as is given in the mathematical expression 3. That is, in this method, the example proposed in FIG. 21 is $N+\Delta-1=2+2-1=3$, and thus, it may be determined to transmit always 3 bits.

As another example, when transmitting the feedback through sidelink unicast or groupcast communication, the number of feedback bits may be determined as the maximum number of bits that should be transmitted in all cases in consideration of the slots belonging to the resource pool, N, and $\Delta$. That is, in this method, in consideration of FIG. 21, the maximum bit number that can be transmitted in all cases is 3, and thus, it may be determined to transmit always 3 bits.

As another example, when transmitting the feedback through sidelink unicast or groupcast communication, the number of feedback bits may be determined by a method for calculating the number of slots where the PSSCH, which may be related to the HARQ-ACK feedback to be transmitted on the PSFCH in the slot in which the PSFCH is to be transmitted, can be transmitted in consideration of the slots belonging to the resource pool, N, and $\Delta$. That is, in this method, in consideration of FIG. 21, the terminal may be determined to transmit, on the PSFCH, one bit in slot n, 2 bits in slot n+3, 3 bits in slot n+8, one bit in slot n+12, 2 bits in slot n+14, and 2 bits in slot n+16, respectively. Of course, in the above-described example, if no control signal for scheduling the PSSCH or PSSCH in the slot related to the HARQ-ACK bits to be determined to be transmitted by the terminal is received, it may be considered that the transmitting terminal has not transmitted even one PSSCH, and thus, it may not be necessary for the terminal to transmit the PSFCH including the HARQ-ACK.

As another example, when N is N=2, and $\Delta$ is "3", that is, when the PSFCH transmission resource is configured every N slots in the resource pool, and the HARQ-ACK of the PSSCH can be transmitted in the slot after the minimum $\Delta$=3 from the transmission of the PSSCH (i.e., after 3 slots, or in three slots), the slot in which the HARQ-ACK feedback is transmitted may be determined as in FIG. 22. FIG. 22 is a diagram illustrating the terminal transmitting the HARQ-ACK feedback, according to another embodiment.

That is, with reference to FIG. 22, the number of HARQ-ACK feedback bits that should be transmitted by the terminal may be 0 bit, 1 bit, 2 bits, 3 bits, or 4 bits in accordance with the slot. For example, the terminal will be able to transmit, in slot n+8, the PSFCH including the HARQ-ACK feedback information as in slot n+2, slot n+3, slot n+4, and slot n+5. When receiving control information for scheduling at least one PSSCH in slot n+2, slot n+3, slot n+4, and slot n+5, the terminal includes 4-bit HARQ-ACK feedback information in the PSFCH to be transmitted, and in the slot in which the PSSCH is unable to be received, the terminal may configure the feedback information to NACK to be transmitted.

As another example, when N is N=4, and Δ is "3", that is, in case that the PSFCH transmission resource is configured every 4 slots in the resource pool, and the HARQ-ACK of the PSSCH can be transmitted in the slot after the minimum Δ=3 from the transmission of the PSSCH (i.e., in this case, after 3 slots, i.e., in three slots), the slot in which the HARQ-ACK feedback is transmitted may be determined as in FIG. 23. FIG. 23 is a diagram illustrating the terminal transmitting the HARQ-ACK feedback, according to another embodiment.

That is, with reference to FIG. 23, the number of HARQ-ACK feedback bits that should be transmitted by the terminal may be 2 bits, 3 bits, 4 bits, 5 bits, or 6 bits in accordance with the slot. For example, the terminal will be able to transmit, in slot n+12, the PSFCH including the HARQ-ACK feedback information as in slot n+1, slot n+2, slot n+3, slot n+4, slot n+5, and slot n+6. When receiving control information for scheduling at least one PSSCH in slot n+1, slot n+2, slot n+3, slot n+4, slot n+5, and slot 6, the terminal includes 6-bit HARQ-ACK feedback information in the PSFCH to be transmitted, and in the slot in which the PSSCH is unable to be received, the terminal may configure the feedback information to NACK to be transmitted.

As illustrated in FIG. 23, the number of HARQ-ACK feedback bits that should be transmitted by the terminal may be increased over N bits in accordance with N and Δ. In this case, it is necessary to transmit information corresponding to a large number of bits on the PSFCH, and this may cause a decoding error probability of the PSFCH to be increased. Accordingly, the terminal may send only the last K bit of the feedback that should be sent, and may not transmit the remaining bits. As described above, K may be equal to N that is the PSFCH resource configuration period, but is not limited thereto.

As another example, when N is N=2, and Δ is "3", that is, when the PSFCH transmission resource is configured every N slots in the resource pool, and the HARQ-ACK of the PSSCH can be transmitted in the slot after the minimum Δ=3 from the transmission of the PSSCH (i.e., after 3 slots, or in three slots), the slot in which the HARQ-ACK feedback is transmitted may be determined as in FIG. 24. FIG. 24 is a diagram illustrating the terminal transmitting the HARQ-ACK feedback, according to another embodiment.

That is, with reference to FIG. 24, the number of HARQ-ACK feedback bits that should be transmitted by the terminal may be 0 bit, 1 bit, 2 bits, 3 bits, or 4 bits in accordance with the slot. For example, in slot n+12, there may be no sidelink slot in which the corresponding PSSCH, on which the HARQ-ACK feedback should be sent, is to be received. That is, a case may exist, in which there is not the feedback bit to be transmitted on the PSFCH resource of a specific slot in accordance with N, Δ, and resource pool configuration, and the minimum number of bits to transmit the HARQ-ACK feedback may be given in Equation (4) below.

The minimum number of HARQ-ACK feedback bits that should be transmitted by the terminal on one PSFCH=max($N-\Delta+1,0$)  (4)

As described above, max(a, b) is a larger value between a and b. That is, in the example provided in FIG. 23, the HARQ-ACK to be transmitted does not always exist in slot n+12, and thus, the terminal may consider that the PSFCH resource does not exist in the corresponding slot. That is, although the PSFCH resource exists, the PSSCH transmission/reception will be able to be performed through disregarding of the corresponding PSFCH resource.

As an example, N may be configured among values including at least one of 1, 2, and 4, but is not limited to such an example. Further, the configuration may differ for each resource pool.

With respect to HARQ-ACK, the corresponding PSSCH may be a PSSCH for unicast or groupcast, which is configured or indicated to transmit the HARQ-ACK, and is transmitted from the same terminal. That is, on the PSSCH on which it is not necessary to send the HARQ-ACK, it may not be necessary to apply the proposed technique. Further, the PSCCH for scheduling the PSSCH may be control information for scheduling the PSSCH, and it is not always necessary to transmit the control information on the PSCCH. Further, although the control information may be one piece of control information, a plurality of pieces of control information may schedule one PSSCH.

The above-described contents may be modified and applied as follows. When receiving the PSSCH in slot n, the terminal having received the PSSCH transmits HARQ-ACK feedback information of the PSSCH on the PSFCH that is fastest among PSFCHs having a gap between the PSSCH and the PSFCH that is equal to or larger than y symbols. Here, y may be a value preconfigured by the transmitting terminal or a value configured in the resource pool from which the corresponding PSSCH or PSFCH is transmitted. For the above-described configuration, each terminal may pre-exchange its own capability with the transmitting terminal, or y may be determined in accordance with the subcarrier spacing.

Embodiment 3-2

Embodiment 3-2 provides a method and an apparatus for configuring a PSFCH resource in a resource pool.

Figure 25:
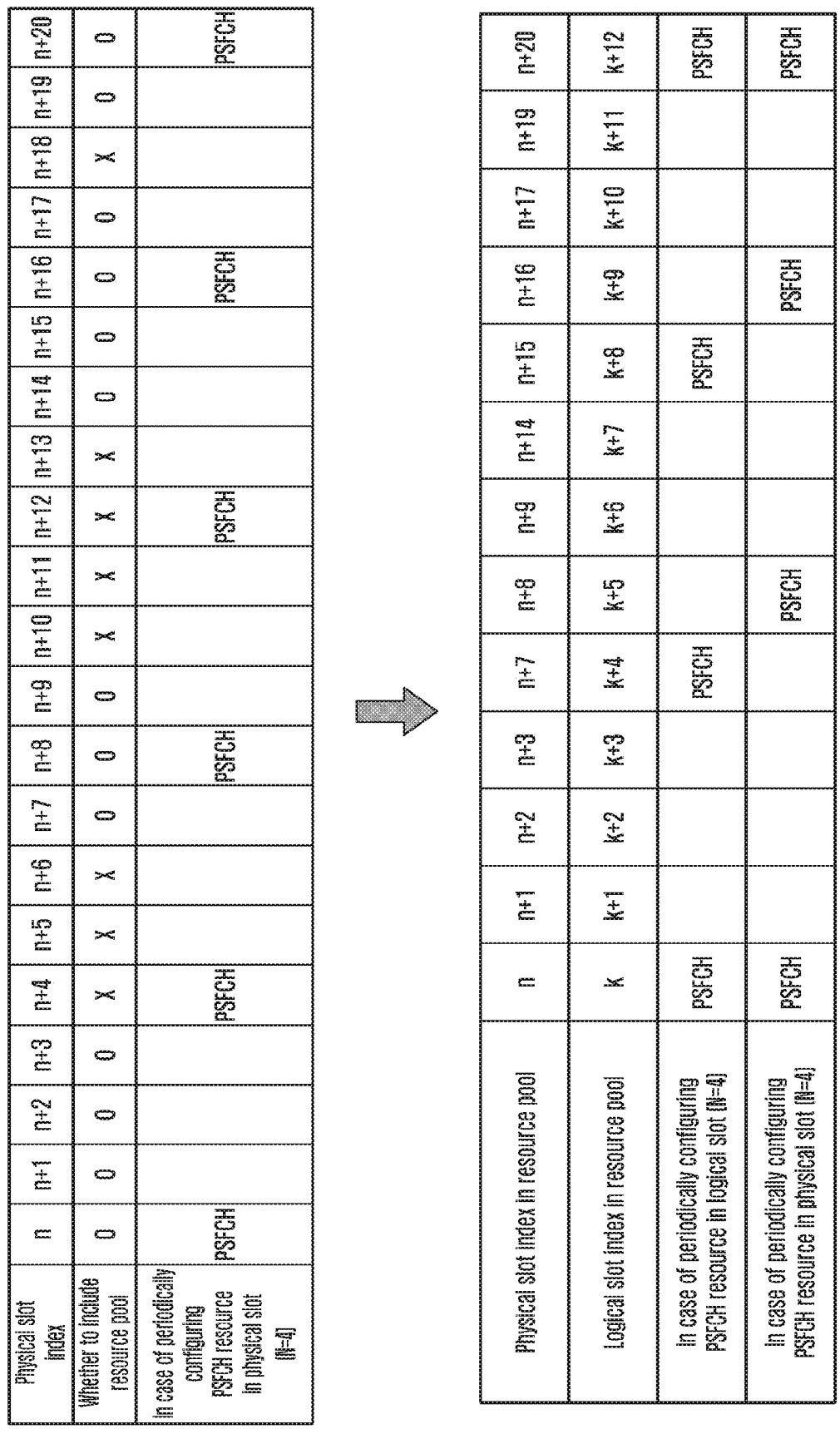
FIG. 25 is a diagram illustrating physical slot indexes and logical slot indexes of slots included in a resource pool configured in accordance with resource pool configuration in physical slots, according to an embodiment.

In accordance with the resource pool configuration, physically contiguous or non-contiguous slots may belong to one resource pool. With respect to the slots belonging to the resource pool, logical slot numbers (indexes) may be contiguously given. The slots belonging to a specific resource pool may have logically contiguous slot indexes, but may not be physically contiguous slots. FIG. 25 is a diagram illustrating physical slot indexes and logical slot indexes of slots included in a resource pool configured in accordance with resource pool configuration in physical slots, according to an embodiment.

As illustrated in FIG. 25, when physical slots n+4, n+5, and n+6 are not included in the resource pool, slot n+7 may be included in the resource pool after slot n+3, and logical slot indexes may be contiguously given to slot k+3 and slot k+4.

As in the method provided in the previous embodiments, the PSFCH resource may be periodically configured every N slots in the resource pool (i.e., the PSFCH resource is periodically configured every N slots using the logical slot indexes), and in contrast, the PSFCH resource may be periodically configured every N slots using physical slot indexes. According to this method, the PSFCH resource may not be periodically configured in the logical slot indexes.

The number of HARQ-ACK feedback bits that should be transmitted by the terminal may be increased over N bits in accordance with N and Δ. In this case, it is necessary to transmit information corresponding to a large number of bits on the PSFCH, and this may cause a decoding error probability of the PSFCH to be increased. Accordingly, the terminal may send only the last K bit of the feedback that should be sent, and may not transmit the remaining bits. As described above, K may be equal to N that is the PSFCH resource configuration period, but is not limited thereto.

Fourth Embodiment

The fourth embodiment provides a method and an apparatus capable of solving or mitigating the problem that one terminal should perform both transmission and reception of the PSFCH in a state where the PSFCH resource does not exist for each slot and N (N is an integer that is larger than "1") is configured. This problem may occur due to half-duplex restriction in that the terminal is unable to simultaneously perform transmission and reception of signals.

Figure 26:
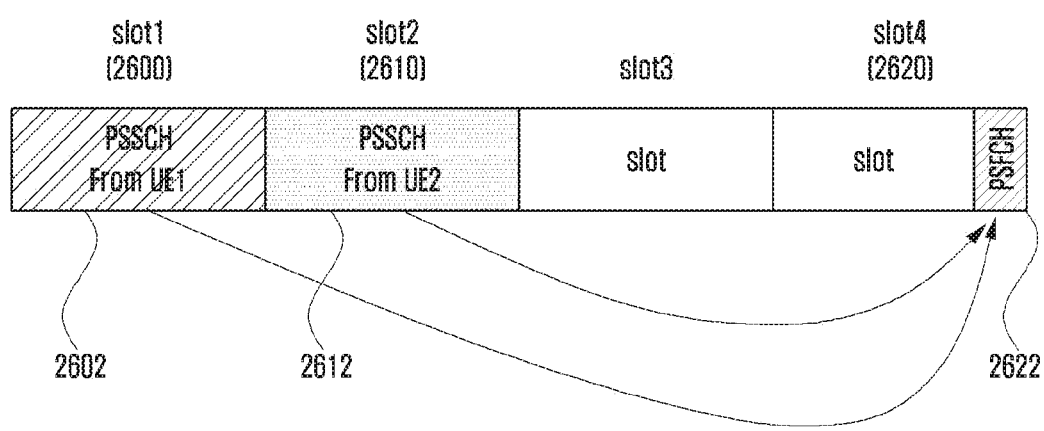
FIG. 26 is a diagram illustrating a time when terminal 1 and terminal 2 should transmit PSFCHs in the same slot for HARQ-ACK feedback transmission for respective transmitted PSSCHs when terminal 1 and terminal 2 perform signal transmission and reception by a connection through unicast or groupcast communication in a sidelink, according to an embodiment.

FIG. 26 is a diagram illustrating terminal 1 (UE1) and terminal 2 (UE2) transmitting PSFCHs in the same slot for HARQ-ACK feedback transmission for respective transmitted PSSCHs when the terminal 1 and the terminal 2 perform signal transmission and reception by a connection through unicast or groupcast communication in a sidelink, according to an embodiment.

Terminal 1 has transmitted a PSSCH 2602 to terminal 2 in slot 1 2600, and terminal 2 has transmitted a PSSCH 2612 to terminal 1 in slot 2 2610. In accordance with the feedback transmission timing, the feedback timing may be determined so that terminal 2 transmits, in slot 4 2620, the HARQ-ACK feedback for the PSSCH transmitted from terminal 1 to terminal 2 in slot 1, and terminal 1 transmits, in slot 4 2620, the HARQ-ACK feedback for the PSSCH transmitted from terminal 2 to terminal 1 in slot 2. Terminal 2 may transmit the PSFCH including the feedback information for the PSSCH transmitted in slot 1 to terminal 1, and terminal 1 may transmit the PSFCH including the feedback information for the PSSCH transmitted in slot 2 to terminal 2. Terminal 1 and terminal 2 should perform both the transmission and reception of a PSFCH 2622, and the transmission and reception of the PSFCH 2622 may be performed in the same symbol.

If a terminal is unable to simultaneously perform transmission and reception of certain signals, the above-described support may not be performed. The terminal being unable to simultaneously perform transmission and reception of a certain signal may be a case in which the terminal has a half-duplex restriction, and in contrast, the terminal being able to simultaneously perform transmission and reception of a certain signal may be a case in which the terminal has a full-duplex function.

When the terminal that is considered as a half-duplex terminal is configured to perform transmission or reception of the PSFCH without simultaneously performing transmission and reception, as the terminal selects and performs the transmission or reception of the sidelink, it may be possible to combine and apply one or more of the following methods.

Method 1: Whether to perform transmission/reception of the PSFCH may be determined based on SCI for scheduling the PSSCH. In this method, it is possible to determine what terminal receives the PSFCH and what terminal transmits the PSFCH based on a bit field value included in the SCI transmitted or received by the terminal. For example, terminal 1 may compare a QoS value (a value of priority, latency, delay, PQI, or 5QI) that is included in the SCI included in the PSCCH when terminal 1 transmits the PSSCH 2602 in slot 1 with a QoS value included in the PSCCH for scheduling the PSSCH 2612 received from terminal 2 in slot 2, and may determine to transmit and receive the HARQ-ACK feedback of the PSSCH corresponding to higher QoS (or having a value corresponding to a higher priority).

If the priority value that is included in the SCI included in the PSCCH 2612 transmitted together when terminal 1 transmits the PSSCH in slot 1 is "1", and the priority value included in the PSCCH for scheduling the PSSCH 2612 received from terminal 2 in slot is "4" (it is assumed that priority 1 is higher than priority 4), terminal 1 receives the PSFCH in the slot 4 2620, terminal 2 transmits the PSFCH in the slot 4 2620, and the PSFCH may include the HARQ-ACK feedback information for the PSSCH transmitted by terminal 1 in the slot 1 2600. If the QoS values corresponding to the PSSCHs transmitted by the terminals are equal to each other, whether to transmit the PSFCH may be determined so that the PSFCH including the HARQ-ACK information for the earlier transmitted PSSCH is transmitted based on the earlier transmitted PSSCH.

Method 2: Whether to perform transmission/reception of the PSFCC may be determined in accordance with the order of PSSCH transmission. In this method, it may be determined what terminal receives the PSFCH and what terminal transmits the PSFCH based on the transmission/reception slot index order of the PSSCH transmitted or received by the terminal, that is, based on what PSSCH is first transmitted. This method may be determined by the timing in which the PSFCH including the HARQ-ACK for the transmitted PSSCH is transmitted.

If the PSFCH transmission/reception resource is located every N slots, the HARQ-ACK for the PSSCH transmitted in slot n is transmitted in slot $\lceil(n+\Delta)/N\rceil \times N$. Further, the HARQ-ACK may be transmitted in slot $n+N+\Delta-1-\mathrm{mod}(n+\Delta-1,N)$. Here, $\Delta$ is a parameter defining a gap between the PSSCH received by the terminal and the transmission slot of the HARQ-ACK, and may be configured for each resource pool, may be a pre-configured value, or may be understood to the terminals through the PC5-RRC configuration. As described above, the $\Delta$ value may be differently defined in accordance with the SCS. That is, it means that the PSFCH including the HARQ-ACK feedback for the PSSCH transmitted in slot $n-N-\Delta+1$, $n-N-\Delta+2$, . . . , $n-\Delta-1$, $n-\Delta$ is transmitted in slot n.

If terminal 1 has transmitted the PSCCH to terminal 2 in slot $n-N-\Delta+1$, and terminal 2 has transmitted the PSSCH to terminal 1 in slot $n-N-\Delta+2$, all the HARQ-ACK feedback information for the two PSSCHs should be transmitted in slot n. According to this method, the first transmitted PSSCH, that is, the PSFCH including the HARQ-ACK for the PSSCH that terminal 1 has transmitted to terminal 2 in slot $n-N-\Delta+1$, may be transmitted/received in slot n. As described above, terminal 1 may receive the PSFCH in slot n, terminal 2 may transmit the PSFCH in slot n, and the PSFCH may include the HARQ-ACK for the PSSCH that the terminal 1 has transmitted to terminal 2 in slot.

Fifth Embodiment

The fifth embodiment provides a method and an apparatus capable of solving or mitigating the problem that one terminal should transmit the PSFCH to several terminals in a state where the PSFCH resource does not exist for each slot and N (N is an integer that is larger than "1") is configured. This problem may occur due to a restriction in that the terminal is able to transmit only one physical channel at a time. A PSFCH transmission method has been described when one terminal should transmit the PSFCH to several terminals, but it will be also possible to apply the contents of this embodiment even when one terminal transmits a plurality of PSFCHs according to a plurality of transmission types to one or two or more terminals. That is, this embodiment can also be applied when one terminal should transmit the PSFCH for unicast and the PSFCH for groupcast to other terminals in the same symbol in the same slot.

Figure 27:
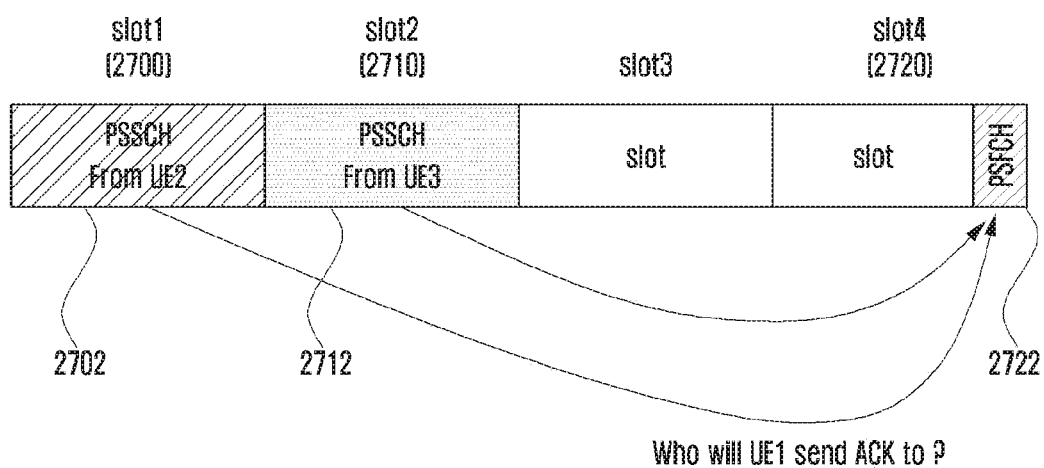
FIG. 27 is a diagram illustrating a time when UE 1 should transmit two PSFCHs in the same slot for HARQ-ACK feedback transmission for respective transmitted PSSCHs when terminal 1 performs signal transmission and reception with terminal 2 and terminal 3 by a connection through unicast or groupcast communication, according to an embodiment.

FIG. 27 is a diagram illustrating a time when terminal 1 (UE1) should transmit two PSFCHs in the same slot for HARQ-ACK feedback transmission for PSSCHs that terminal 2 (UE2) and terminal 3 (UE3) have transmitted to terminal 1 (UE1) when UE1 performs signal transmission and reception with UE2 and UE3 by a connection through unicast or groupcast communication, according to an embodiment. As described above, terminal 2 and terminal 3 may be different from each other, or may be the same terminal. The PSFCH transmission method has been described when one terminal should transmit the PSFCH to several terminals, but if this embodiment is applied when one terminal transmits a plurality of PSFCHs according to a plurality of transmission types to one terminal, the terminal 2 and terminal 3 may be the same terminal.

UE2 has transmitted PSSCH 2702 to UE1 in slot 1 2700, and UE3 has transmitted PSSCH 2712 to UE1 in slot 2 2710. The PSFCH transmission/reception timing may be determined so that UE1 transmits HARQ-ACK feedback information for two PSSCHs to UE2 and UE3 in slot 4 2720 by encoding the HARQ-ACK feedback information on PSFCHs 2722. If UE1 can transmit the PSFCH (hereinafter, PSFCH 2) to UE2 and the PSFCH (hereinafter, PSFCH 3) to UE3 in all in the slot 4 2720, UE2 and UE3 can simultaneously receive the PSFCH from UE1, and can identify the HARQ-ACK feedback information for the PSSCH sent by UE2 and UE3 themselves. However, if the UE1 is unable to simultaneously transmit PSFCH 2 and PSFCH 3 in the slot 4 2720, it is necessary for UE1 to determine which PSFCH UE1 should transmit. The reason why UE1 is unable to simultaneously transmit PSFCH 2 and PSFCH 3 may be that insufficient transmission power is provided, and if divided power is used for each of the PSFCHs, the coverage of the respective PSFCHs may be reduced.

It may be possible to combine and apply one or more of the following as methods in which the terminal selects and transmits (or receives) one PSFCH to prevent the terminal from simultaneously transmitting or receiving two or more PSFCHs.

Method 1: The PSFCH that the terminal is to transmit/receive may be determined based on SCI for scheduling the PSSCH. In this method, it is possible to determine the PSSCH to which the PSFCH corresponds that the terminal is to transmit based on bit field values included in the received SCI. For example, as illustrated in FIG. 27, terminal 1 may compare a QoS value (a value of priority, latency, delay, PQI, or 5QI) that is included in the SCI included in the PSCCH transmitted together for the corresponding PSSCH scheduling when terminal 2 transmits the PSSCH 2702 to terminal 1 in the slot 1 2700 with a QoS value included in the SCI included in the PSCCH transmitted together for the corresponding PSSCH scheduling when terminal 3 transmits the PSSCH 2712 to terminal 1 in the slot 2 2710, and the terminal 1 may determine to transmit and receive the HARQ-ACK feedback of the PSSCH corresponding to higher QoS (or having a value corresponding to a higher priority).

For example, if the priority value that is included in the SCI included in the PSCCH transmitted for scheduling of the PSSCH 2702 received from terminal 2 in the slot 1 2700 is "1", and the priority value included in the SCI included in the PSCCH transmitted for scheduling of the PSSCH 2712 received from terminal 3 in the slot 2 2710 is "4" (it is assumed that priority 1 is higher than priority 4), terminal 1 transmits the PSFCH to terminal 2 in the slot 4 2720, and the PSFCH may include the HARQ-ACK feedback information for the PSSCH transmitted by terminal 2 in the slot 1 2700. If the QoS values corresponding to the PSSCHs transmitted by the terminals are equal to each other, whether to transmit the PSFCH may be determined so that the PSFCH including the HARQ-ACK information for the earlier transmitted PSSCH is transmitted based on the earlier transmitted PSSCH.

Method 2: The PSFCH that the terminal is to transmit may be determined in accordance with the order of PSSCH transmission. In this method, it may be determined whether to transmit the PSFCH including the HARQ-ACK for what PSSCH based on the transmission/reception slot index order of the PSSCH transmitted or received by the terminal, that is, based on what PSSCH is first transmitted. This method may be determined by the timing in which the PSFCH including the HARQ-ACK for the transmitted PSSCH is transmitted.

For example, if the PSFCH transmission/reception resource is located every N slots, the HARQ-ACK for the PSSCH transmitted in slot n is transmitted in slot $\lceil (n+\Delta)/N \rceil \times N$. Further, the HARQ-ACK may be transmitted in slot $n+N+\Delta-1-\mathrm{mod}(n+\Delta-1,N)$. Here, $\Delta$ is a parameter defining a gap between the PSSCH received by the terminal and the transmission slot of the HARQ-ACK, and may be configured for each resource pool, may be a pre-configured value, or may be understood to the terminals through the PC5-RRC configuration. As described above, the $\Delta$ value may be differently defined in accordance with the SCS. That is, the PSFCH including the HARQ-ACK feedback for the PSSCH transmitted in slot $n-N-\Delta+1, n-N-\Delta+2, \ldots, n-\Delta-1, n-\Delta$ is transmitted in slot n.

If terminal 1 has received the PSCCH from terminal 2 in slot $n-N-\Delta+1$, and terminal 1 has also received the PSSCH from terminal 3 in slot $n-N-\Delta+2$, all the HARQ-ACK feedback information for the two PSSCHs should be transmitted in slot n. According to this method, the first transmitted PSSCH, that is, the PSFCH including the HARQ-ACK for the PSSCH that terminal 1 has received from terminal 2 in slot $n-N-\Delta+1$, may be transmitted/received in slot n. As described above, both terminal 2 and terminal 3 attempt to perform decoding of the PSFCH in slot n, and because terminal 1 has transmitted the PSFCH to terminal 2, only terminal 2 may be successful in receiving the PSFCH.

Method 3: The terminal can simultaneously transmit feedback information to two or more terminals using one PSFCH. This method may be determined by the timing in which the PSFCH including the HARQ-ACK for the transmitted PSSCH is transmitted. If the PSFCH transmission/reception resource is located every N slots, the HARQ-ACK for the PSSCH transmitted in slot n is transmitted in slot $\lceil (n+\Delta)/N \rceil \times N$. Further, the HARQ-ACK may be transmitted in slot $n+N+\Delta-1-\mathrm{mod}(n+\Delta-1,N)$. Here, $\Delta$ is a parameter defining a gap between the PSSCH received by the terminal and the transmission slot of the HARQ-ACK, and may be configured for each resource pool, may be a pre-configured value, or may be understood to the terminals through the PC5-RRC configuration. As described above, the $\Delta$ value may be differently defined in accordance with the SCS. That is, it may mean that the PSFCH including the HARQ-ACK feedback for the PSSCH transmitted in slot n−N−Δ+1, n−N−Δ+2, ..., n−Δ−1, n−Δ is transmitted in slot n. If terminal 1 has received the PSCCH from terminal 2 in slot n−N−Δ+1, and terminal 1 has also received the PSSCH from terminal 3 in slot n−N−Δ+2, all the HARQ-ACK feedback information for the two PSSCHs should be transmitted in slot n.

According to this method, when transmitting N pieces of HARQ-ACK information in slot n, terminal 1 may deploy the HARQ-ACK information for the PSSCH received from terminal 2 in slot n−N−Δ+1 at the first location of the N pieces of HARQ-ACK information, and may deploy the HARQ-ACK information for the PSSCH received from terminal 3 in slot n−N−Δ+2 at the second location of the N pieces of HARQ-ACK information to be transmitted. If terminal 1 is unable to receive the PSSCH in a certain slot in a predetermined section, the terminal may configure the HARQ-ACK feedback codebook by configuring the HARQ-ACK feedback corresponding to the slot to a predetermined value. For example, terminal 1 may determine the HARQ-ACK feedback value for the PSSCH that has not been trasnmitted as a value that means NACK.

Method 4: Whether to transmit the PSFCH may be determined in accordance with the number of feedback bits that should be transmitted by the terminal. If it is required for terminal 1 to transmit the feedback to terminal 2 and terminal 3, the feedback is transmitted to the terminal that requires a larger amount of feedback on the PSFCH. If the same amount of feedback is to be transmitted to terminal 2 and terminal 3, the terminal may optionally determine to what terminal the feedback is to be transmitted, or parts or combination of the above-described methods 1, 2, and 3 may be applied.

Method 5: The terminal may transmit a plurality of PSFCHs including the feedback to be transmitted. However, when transmitting a plurality of PSFCHs, if the sum of powers being used for the PSFCH transmission is larger than the maximum power the terminal $P_{c,max}$ that can be used by the terminal for the sidelink transmission, the terminal reduces the power of the ASFCH in the original PSFCH power ratio so that the sum of all the PSFCH powers becomes $P_{c,max}$, and transmits the reduced power. For example, when the terminal should transmit PSFCH1 and PSFCH2, respective calculated powers are P1 and P2, and P1+P2>$P_{c,max}$, the terminal may determine the power of PSFCH1 as $P_{c,max} \times P1/(P1+P2)$, and may determine the power of PSFCH2 as $P_{c,max} \times P2/(P1+P2)$. The sum of the powers of PSFCH1 and PSFCH2 becomes $P_{c,max}$.

Method 6: Whether to transmit the PSFCH may be determined in accordance with the number of pieces of scheduling control information received by the terminal. That is, whether to transmit the PSFCH is determined in accordance with the number of PSSCHs scheduled to be received by the terminal. If it is required for terminal 1 to transmit the feedback to terminal 2 and terminal 3, the feedback is transmitted to the terminal that is scheduled to receive a larger number of PSSCHs on the PSFCH. If the same number of PSSCHs are scheduled from terminal 2 and terminal 3, the terminal may optionally determine to what terminal the feedback is to be transmitted, or parts or combination of the above-described methods 1, 2, 3, 4, and 5 may be applied.

As described above, for convenience in explanation, the first to fifth embodiments have been described individually. However, the respective embodiments include related operations, and thus, it is possible to combine at least two embodiments.

Figure 28:
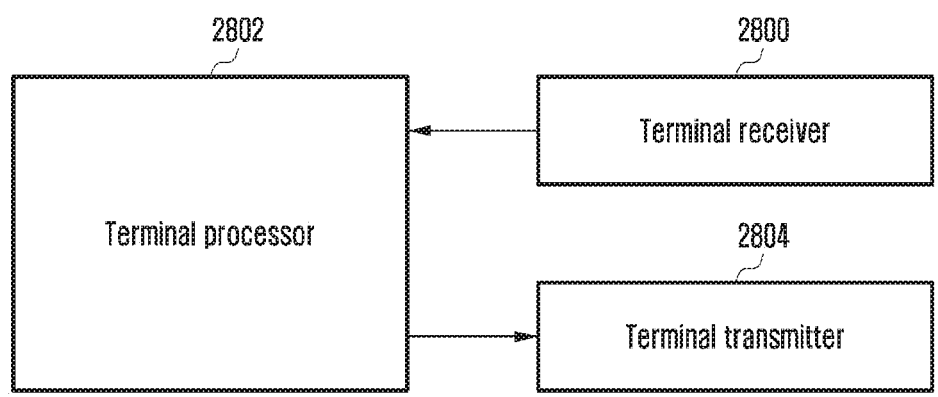
FIG. 28 is a block diagram illustrating the internal structure of a terminal, according to an embodiment.
Figure 29:
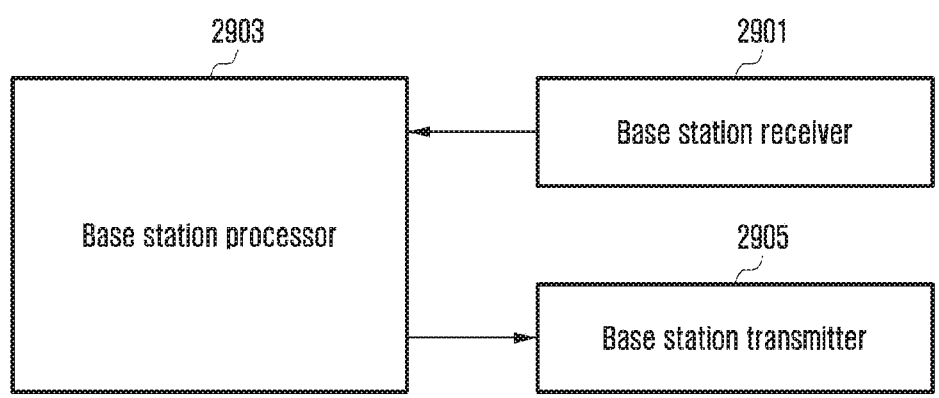
FIG. 29 is a block diagram illustrating the internal structure of a base station, according to an embodiment.

In order to perform the above-described embodiments of the disclosure, transmitters, receivers, and processors of a terminal and a base station are illustrated in FIGS. 28 and 29. In the first and second embodiments, in order to perform operations of configuring the HARQ-ACK feedback information, determining whether to transmit the HARQ-ACK feedback, and transmitting the feedback, the transmission/reception method between the base station and the terminal or between the transmitting end and the receiving end has been provided, and in order to perform the method, the receivers, processors, and transmitters of the base station and the terminal should operate according to the respective embodiments.

Specifically, FIG. 28 is a block diagram illustrating the internal structure of a terminal, according to an embodiment. As illustrated in FIG. 28, the terminal includes a terminal receiver 2800, a terminal transmitter 2804, and a terminal processor 2802. The terminal receiver 2800 and the terminal transmitter 2804 may be commonly called a transceiver. The transceiver may transmit/receive a signal with a base station. The signal may include control information and data. For this, the transceiver may be composed of an RF transmitter for up-converting and amplifying the frequency of a transmitted signal, and an RF receiver for low-noise-amplifying and down-converting the frequency of a received signal. Further, the transceiver may receive a signal through a radio channel, and may output the received signal to the terminal processor 2802. The transceiver may also transmit the signal that is output from the terminal processor 2802 on the radio channel. The terminal processor 2802 may control a series of processes so that the terminal operates according to the above-described embodiments of the disclosure. For example, the terminal receiver 2800 receives control information from the base station, the terminal processor 2802 determines whether to transmit the HARQ-ACK feedback and feedback information in accordance with the control information and preconfigured configuration information. Thereafter, the terminal transmitter 2804 may transfer the scheduled feedback to the base station.

FIG. 29 is a diagram illustrating the internal structure of a base station, according to an embodiment. As illustrated in FIG. 29, a base station includes a base station receiver 2901, a base station transmitter 2905, and a base station processor 2903. The base station receiver 2901 and the base station transmitter 2905 may be commonly called a transceiver. The transceiver may transmit/receive a signal with a terminal. The signal may include control information and data. For this, the transceiver may be composed of an RF transmitter for up-converting and amplifying the frequency of a transmitted signal, and an RF receiver for low-noise-amplifying and down-converting the frequency of a received signal. Further, the transceiver may receive a signal through a radio channel, and may output the received signal to the base station processor 2903. The transceiver may also transmit the signal that is output from the base station processor 2903 through the radio channel. The base station processor 2903 may control a series of processes so that the base station operates according to the above-described embodiments of the disclosure. For example, the base station processor 2903 may control to configure control information in accordance with HARQ-ACK feedback information of the terminal and to receive the feedback in accordance with the control information. Thereafter, the base station transmitter 2905 transmits related scheduling control information, and the base station receiver 2901 receives the feedback information together with the scheduling information.

Embodiments of the disclosure described herein are merely for easy explanation of the technical contents of the disclosure and proposal of specific examples to help understanding of the disclosure, but are not intended to limit the scope of the disclosure. That is, it will be apparent to those of ordinary skill in the art to which the disclosure pertains that other modified examples that are based on the technical idea of the disclosure can be embodied. Further, according to circumstances, the respective embodiments may be operated in combination. Further, other modified examples based on the technical idea of the above-described embodiments may be embodied in an LTE system and 5G system.

While the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. A method performed by a terminal in a communication system, the method comprising:
   receiving, from one or more terminals, a plurality of sidelink data including first sidelink data and second sidelink data;
   determining that a first resource for transmitting first feedback information for the first sidelink data and a second resource for transmitting second feedback information for the second sidelink data overlap each other;
   transmitting, to one or more terminals, feedback information corresponding to one of the first feedback information and the second feedback information having a higher priority;
   transmitting, to another terminal, third sidelink data;
   receiving, from another terminal, fourth sidelink data;
   identifying that a third resource for receiving third feedback information for the third sidelink data and a fourth resource for transmitting fourth feedback information for the fourth sidelink data overlap each other; and
   transmitting or receiving feedback information corresponding to one of the third feedback information and the fourth feedback information having a higher priority,
   wherein a priority corresponding to each of the plurality of the sidelink data is based on sidelink control information scheduling each of the plurality of the sidelink data.

2. The method of claim 1, wherein the priority is indicated by a field of the sidelink control information.

3. The method of claim 1, wherein resources for feedback information are identified based on a period of the resources and a minimum number of slots between sidelink data and corresponding feedback information.

4. The method of claim 3, wherein the period of the resources and the minimum number of slots are included in resource pool configuration information.

5. The method of claim 3, wherein the feedback information is transmitted in a first slot among a plurality of slots including the resources.

6. The method of claim 1, further comprising:
   in case that the first sidelink data is received earlier than the second sidelink data, the first resource and the second resource overlap each other, and priorities corresponding to the first sidelink data and the second sidelink data are the same, transmitting the first feedback information earlier than the second feedback information.

7. A terminal in a communication system, the terminal comprising:
   a transceiver; and
   a controller configured to:
      receive, from one or more terminals via the transceiver, a plurality of sidelink data including first sidelink data and second sidelink data,
      determine that a first resource for transmitting first feedback information for the first sidelink data and a second resource for transmitting second feedback information for the second sidelink data overlap each other,
      transmit, to one or more terminals via the transceiver, feedback information corresponding to one of the first feedback information and the second feedback information having a higher priority,
      transmit, to another terminal via the transceiver, third sidelink data,
      receive, from another terminal via the transceiver, fourth sidelink data,
      identify that a third resource for receiving third feedback information for the third sidelink data and a fourth resource for transmitting fourth feedback information for the fourth sidelink data overlap each other, and
      transmit or receive, via the transceiver, feedback information corresponding to one of the third feedback information and the fourth feedback information having a higher priority,
   wherein a priority corresponding to each of the plurality of the sidelink data is based on sidelink control information scheduling each of the plurality of the sidelink data.

8. The terminal of claim 7, wherein the priority is indicated by a field of the sidelink control information.

9. The terminal of claim 7, wherein resources for feedback information are identified based on a period of the resources and a minimum number of slots between sidelink data and corresponding feedback information.

10. The terminal of claim 9, wherein the period of the resources and the minimum number of slots are included in resource pool configuration information.

11. The terminal of claim 9, wherein the feedback information is transmitted in a first slot among a plurality of slots including the resources.

12. The terminal of claim 7, wherein the controller is further configured to transmit the first feedback information earlier than the second feedback information, in case that the first sidelink data is received earlier than the second sidelink data, the first resource and the second resource overlap each other, and priorities corresponding to the first sidelink data and the second sidelink data are the same.

* * * * *